United States Patent [19]
Costin

[11] Patent Number: 6,140,602
[45] Date of Patent: Oct. 31, 2000

[54] MARKING OF FABRICS AND OTHER MATERIALS USING A LASER

[75] Inventor: Darryl Costin, Perrysburg, Ohio

[73] Assignee: Technolines LLC, Perrysburg, Ohio

[21] Appl. No.: 08/844,114

[22] Filed: Apr. 29, 1997

[51] Int. Cl.[7] .................................................. B23K 26/40
[52] U.S. Cl. ................................ 219/121.69; 219/121.68
[58] Field of Search ........................... 219/121.6, 121.61, 219/121.62, 121.68, 121.69, 121.8, 121.83, 121.85, 121.67, 121.75; 8/444

[56] References Cited

U.S. PATENT DOCUMENTS

| | | | |
|---|---|---|---|
| 4,307,282 | 12/1981 | Gappa | 219/121.8 |
| 4,316,073 | 2/1982 | Lemelson | 219/121.8 |
| 4,378,480 | 3/1983 | Langhans | 219/121.77 |
| 4,629,858 | 12/1986 | Kyle | 219/121.69 |
| 5,200,592 | 4/1993 | Yabu | 219/121.67 |
| 5,262,613 | 11/1993 | Norris et al. | 219/121.68 |
| 5,367,141 | 11/1994 | Piltch | 219/121.67 |
| 5,567,207 | 10/1996 | Lockman et al. | 8/444 |
| 5,605,641 | 2/1997 | Chiba et al. | 219/121.69 |

FOREIGN PATENT DOCUMENTS

| | | | |
|---|---|---|---|
| 2698302 | 5/1994 | France . | |
| 3029104 | 2/1982 | Germany | 219/121.8 |
| 3916126 | 11/1990 | Germany . | |
| 61-242783 | 10/1986 | Japan | 219/121.8 |
| 62-94343 | 4/1987 | Japan | 219/121.69 |
| 62-110892 | 5/1987 | Japan | 219/121.77 |
| 62-259691 | 11/1987 | Japan | 219/121.75 |
| 63-273588 | 11/1988 | Japan | 219/121.75 |
| 1-95885 | 4/1989 | Japan | 219/121.69 |
| 2294656 | 5/1996 | United Kingdom . | |
| 2 294 656 | 8/1996 | United Kingdom . | |

OTHER PUBLICATIONS

Stevenson, Richard L., Industrial Strength Laser Marking, 1992, Florida.

*Primary Examiner*—Geoffrey S. Evans
*Attorney, Agent, or Firm*—Scott C. Harris, Esq.

[57] ABSTRACT

A unique method imparts laser induced patterns and other designs on thin fabrics and leathers. The method uses a laser beam to slightly penetrate the surface of the product at a controlled specific speed. The laser beam is directed at the product either directly or through mirrors, shutters or lenses. The speed of the laser beam relative to the surface of the product is controlled within a predetermined range. Specific identification and control of this relative speed for a particular product are the keys to overcoming technical barriers which have prevented such use of lasers in the past. Preferably a computer is used to provide a signal to a drive mechanism to control the relative speed. The drive mechanism can control movement of the laser, the product, a mirror or a lens.

154 Claims, 6 Drawing Sheets

MARKING OF FABRICS AND OTHER MATERIALS USING A LASER

BACKGROUND OF THE INVENTION

This invention relates in general to a method of forming designs on fabrics and leathers. In particular, this invention relates to a specific method of forming laser induced patterns and other designs on thin fabrics and leathers.

Thin fabrics and leathers have commonly been used to make clothing, footwear, purses and wallets, vehicle interiors, furniture coverings, wall coverings and many other manufactured goods. Patterns and other designs have been formed on the thin fabrics and leathers to give them a more attractive appearance.

The typical methods of forming designs on thin fabrics are chemical dyeing, weaving, ink jet printing and embossing. Unfortunately, such methods are either very costly in terms of capital investment and operating cost or they are plagued with environmental problems.

Intricate designs on thin fabrics and leathers are often more interesting and attractive than simple designs. However, there has previously been no cost-effective method of forming intricate designs on leathers. Methods such as chemical dyeing and weaving which can form intricate designs on fabrics are not suitable for forming such designs on leathers. As a result, intricate designs have only been formed on leathers by handworking methods or other costly methods.

Lasers have been used in the fabric industry to cut thin fabrics into separate pieces. They have also been used to engrave designs on carpets and heavy pile fabrics. In the past, certain technical barriers have prevented the use of lasers to form designs on thin fabrics and leathers. When such use was attempted, the laser beam caused carbonization, complete melting and/or burn-through at the point of contact. This resulted in complete penetration and the formation of an undesirable hole or defect in the fabric or leather. Particular difficulties were encountered with thin fabrics having an irregular thickness.

If the technical barriers could be overcome, a laser would be a desirable method of forming designs on thin fabrics and leathers. For one thing, a laser is well adapted for forming intricate designs on products. Moreover, laser manufacturing methods are generally cost-effective and do not cause environmental problems. Thus it would be desirable to provide a suitable method of using a laser to form designs on thin fabrics and leathers.

SUMMARY OF THE INVENTION

This invention relates to a unique method to impart laser induced patterns and other designs on thin fabrics and leathers. The method uses a laser beam to slightly penetrate the surface of the product at a controlled specific speed. The laser beam is directed at the product either directly or through mirrors, shutters or lenses. The speed of the laser beam relative to the surface of the product is controlled within a predetermined range. Specific identification and control of this relative speed for a particular product are the keys to overcoming technical barriers which have prevented such use of lasers in the past. Preferably a computer is used to provide a signal to a drive mechanism to control the relative speed. The drive mechanism can control movement of the laser, the product, a mirror or a lens.

This invention provides many benefits unavailable in the prior art. Laser induced designs can be imparted onto thin fabrics and leathers, overcoming the technical barriers of carbonization, complete melting and/or burn-through. New effects and designs can be imparted onto thin fabrics and leathers which are not possible by any other means, thereby creating new products with expanded market opportunities. Intricate laser induced designs can be imparted onto leather and suede where unique designs are seldom found. The products made by this method have superior mechanical properties and chemical stability compared to chemical dyed products.

The designed fabrics and leathers can be produced very cost efficiently with modern automatic laser systems. The operating parameters for the particular kind of fabric or leather are created, modulated and controlled by computer. The method avoids the costs associated with a heavy investment in capital equipment and environmental protection equipment. No preprocessing of the fabric such as soaking or spraying is required prior to the impingement of the laser beam. No postprocessing of the fabric is required following the impingement of the laser beam.

Various objects and advantages of this invention will become apparent to those skilled in the art from the following detailed description of the preferred embodiment, when read in light of the accompanying drawings.

BRIEF DESCRIPTION OF THE DRAWINGS

FIG. 1 illustrates a method in which the laser is moved to control the speed of the laser beam relative to the surface of the fabric.

FIG. 2 illustrates a method in which the fabric is moved to control the speed of the laser beam relative to the surface of the fabric.

FIG. 3 illustrates a method in which both the laser and the fabric are moved, and specifically where the fabric is positioned on a moving roll.

FIG. 4 illustrates a method in which a mirror is moved to direct the laser beam onto the surface of the fabric.

FIG. 5 illustrates a method in which a mirror is moved to direct the laser beam onto the surface of the fabric, and where the fabric is positioned on a moving roll.

FIG. 6 illustrates a method in which a main mirror and a plurality of secondary mirrors are moved to direct the laser beam onto the surface of the fabric.

FIG. 7 illustrates a method in which a main mirror and a plurality of secondary mirrors are moved to direct the laser beam onto the surface of the fabric, and where the fabric is positioned on a moving roll.

FIG. 8 illustrates a method in which a shutter periodically interrupts the laser beam to form a discontinuous design on the surface of the fabric.

FIG. 9 illustrates a method in which a lens is moved to direct the laser beam onto the surface of the fabric, and in which a shutter periodically interrupts the laser beam to form a discontinuous design on the surface of the fabric.

DETAILED DESCRIPTION OF THE PREFERRED EMBODIMENT

Figure 1:
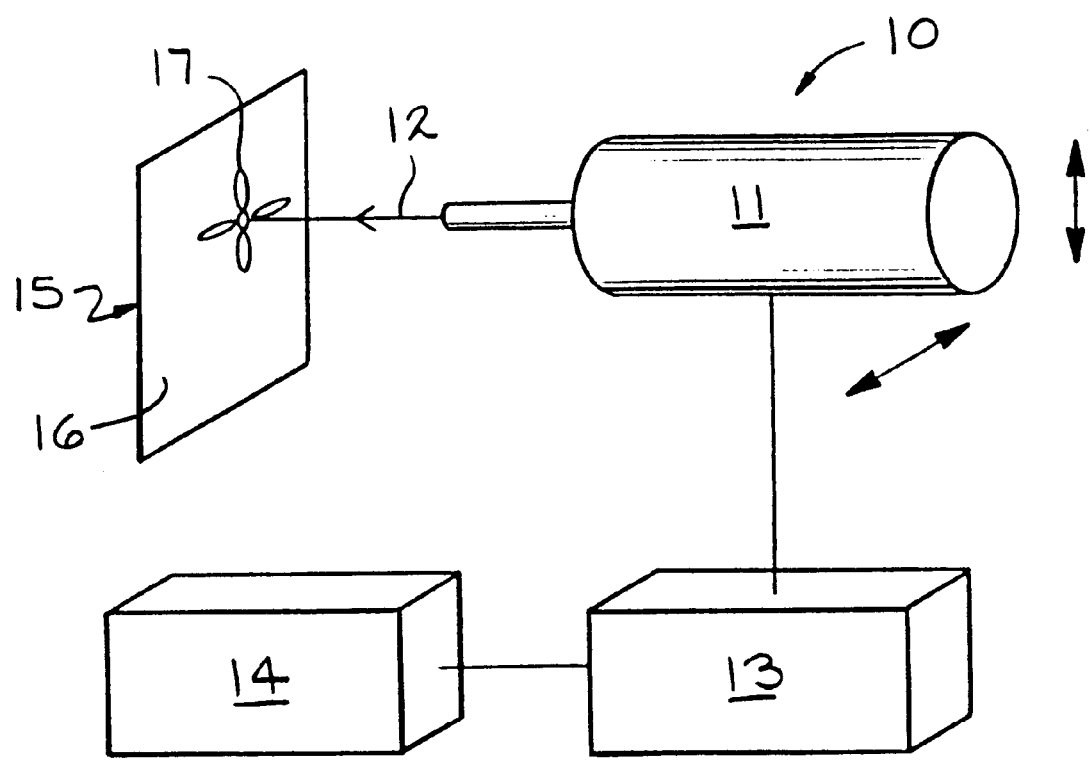
FIGS. 1 through 9 are schematic views of a laser method of forming designs on thin fabrics and leathers in accordance with this invention.

Referring now to the drawings, there is illustrated in FIG. 1 a laser method of forming designs on thin fabrics and leathers in accordance with this invention. The method utilizes the apparatus indicated generally at 10. The apparatus 10 includes a laser 11 which generates a laser beam 12. The laser 11 is positioned so that it can be moved in the vertical and horizontal directions indicated by the arrows in the drawing. Such movement results in a corresponding movement of the laser beam 12. A drive mechanism in the form of a laser drive 13 is connected to the laser 11. The laser drive 13 is adapted to cause movement of the laser 11 in the vertical and horizontal directions. Alternatively, the laser drive 13 could cause the laser 11 to rotate vertically and horizontally on a stationary pivot.

An electronic controller such as a computer 14 is connected to the laser drive 13. The computer 14 is adapted to provide a signal to the laser drive 13 to control movement of the laser 11. The computer 14 is programmed by particular software (not shown) developed to control such movement.

The laser 11 is positioned to generate a laser beam 12 in the direction of a thin fabric 15. The fabric 15 includes a surface 16. In operation, the laser 11 is activated and generates the laser beam 12. The laser beam 12 contacts the surface 16 of the fabric 15. The computer 14 provides signals to the laser drive 13. In response to the signals, the laser drive 13 causes movement of the laser 11 and the laser beam 12. Movement of the laser beam 12 in contact with the surface 16 of the fabric 15 causes a design 17 to be formed on the surface 16.

The laser beam 12 moves at a particular speed relative to the surface 16 of the fabric 15. In accordance with the method of this invention, the speed of the laser beam 12 relative to the surface 16 of the fabric 15 is controlled within a predetermined range. It has now been discovered that specific identification and control of this speed are the keys to preventing carbonization, complete melting and/or burn-through of the fabric. This invention thereby overcomes the technical barriers which have prevented the use of lasers in the past to form designs on thin fabrics and leathers.

It is necessary to maintain this speed at a level above a Threshold Speed where the laser beam fully penetrates the fabric and results in carbonization, complete melting and/or burn-through. However, it is also necessary to maintain this speed at a level below a Maximum Speed where a design cannot be formed on the fabric. The range of speeds between the Threshold Speed and the Maximum Speed will be referred to herein as the Process Operating Speed. The Process Operating Speed is a function of the type of fabric or leather material, the thickness of the material, the construction of the material, the power and wavelength of the laser beam, the distance between the laser and the material, and the type of design formed on the surface of the material. Statistically designed experiments can best be employed to determine the specific Process Operating Speed for each material and method. Further, statistical models can be used to determine the Process Operating Speed for new fabrics or leathers and new lasers. The Process Operating Speed for a variety of thin fabrics and leathers is shown in Table I, along with the type of laser designs that can be formed on the materials. The variation in Process Operating Speed is due to the factors mentioned above.

TABLE I

Process Operating Speed for Laser Design on General Fabrics and Leathers

| Material (Woven, Nonwoven or Knitted) | Design | Operating Speed (m/sec) |
|---|---|---|
| Cotton | SC | 0.08–1.5 |
| Rayon | SC | 0.08–1.5 |
| Acetate | SC | 0.08–1.5 |
| Nylon | SC, FP | 1.0–1.5 |
| Artificial Fiber | SC, FP | 0.08–1.5 |
| Half Wool | SC, R | 1.0–1.5 |
| Wool | SC, R | 0.01–1.0 |
| Flax | SC, R | 0.05–1.5 |
| Natural Silk | SC | 1.0–1.5 |
| Artificial Silk | SC, FP | 1.0–1.5 |
| Mixed Fiber Fabric | SC, FP, R | 0.01–1.5 |
| Chemical Fiber Fabric | SC, FP, R | 0.01–1.0 |
| Polyamide, Polyamide Chloride | SC, FP | 0.01–1.0 |
| Lavsan | SC | 0.01–1.0 |
| Pig Leather | SC, FP, R | 0.01–1.0 |
| Kid Leather | SC, FP, R | 0.01–1.0 |
| Box Calf Leather | SC, FP, R | 0.01–1.0 |
| Chamois Leather | SC, FP, R | 0.01–1.0 |
| Artificial Leather | SC, FP, R | 0.01–1.0 |

Design Key:
SC = Single Color,
FP = Full Penetrating,
R = Relief

It has also been discovered that there is a Critical Operating Speed above which the propensity to not form a design on the fabric increases, and below which the propensity to cause burn-through, complete melting and/or carbonization increases. Statistically designed experiments can be used to determine the Critical Operating Speed for a particular material and method. Since the Critical Operating Speed of new fabrics and leathers is a function of numerous material and process variables, statistical quantitative models derived from computer designed experiments have been employed to determine the speed.

In the embodiment illustrated in FIG. 1, the computer program feeds the laser drive 13 with the specific movements and timing necessary to form the desired design 17 on the fabric 15 and maintain the Critical Operating Speed. The Critical Operating Speed for a variety of thin fabrics and leathers is shown in Table II. It can be seen that the Critical Operating Speed varied between a low of 0.01 meters/second for chamois leather suede and a high of 1.2 meters/second for rayon silk. The Critical Operating Speed for all other thin fabrics and leathers varied between these two extremes.

TABLE II

Critical Operating Speed for Laser Design on Specific Fabrics and Leathers

| Material | Design | Critical Operating Speed +/− 0.02 (m/sec) |
|---|---|---|
| Artificial Leather | SC, R | 0.05 |
| Rayon Silk (100%) | SC | 1.2 |
| Nylon Silk (100%) | FP | 1.2 |
| Cotton Velveteen (100%) | SC, R | 0.8 |
| Heavy Half Wool (62% Wool, 23% Rayon, 15% Nylon) | SC, R | 0.6 |
| Heavy Wool | SC, R | 0.4 |
| Nonwoven Canvas (70% Cotton, 30% Rayon) | SC | 0.9 |
| Raincoat Fabric (100% Cotton) | SC | 1.2 |

TABLE II-continued

Critical Operating Speed for Laser Design on Specific Fabrics and Leathers

| Material | Design | Critical Operating Speed +/- 0.02 (m/sec) |
|---|---|---|
| Shirt & Chemise Fabric (100% Cotton) | SC | 1.2 |
| Clothing Fabric (50% Cotton, 50% Polyamide) | SC, FP | 1.0 |
| Denim Fabric (100% Cotton) | SC | 1.0 |
| Chamois Leather Suede | SC, R | 0.01 |
| Pig Leather | SC, R | 0.05 |

Design Key:
SC = Single Color,
FP = Full Penetrating,
R = Relief

The specific laser used can be any conventional laser capable of functioning as described above. A preferred laser is a $CO_2$ laser with a radiation capacity of about 5–150 watts and a wavelength of about 10.6 micrometers, with a distance between the laser and the fabric of about 0.08–0.5 meters. Other lasers such as a well-known YAG laser having a wavelength of about 1.06 micrometers can also be used in this invention.

The laser beam can be modulated or otherwise manipulated to produce different effects on the design. Suitable means include electro-optic modulators, acoustic optic modulators, laser-oscillated voltage, On and Off synchronous mechanical devices, masking methods, methods of applying mechanical shift, or systems in sync with laser scanning operations.

The electronic controller may be embodied as any conventional computer, microprocessor, or other similar electronic computing apparatus. Additionally, any suitable software or computing language may be used to control movement of the laser.

This invention provides for the production of unique laser designs on a variety of thin fabrics and a variety of leathers. The fabrics can be formed from natural or artificial fibers. The fabrics can be woven, nonwoven or knitted. Specific thin fabrics include cotton, rayon, nylon, wool, natural and artificial silk, acetate, flax, polyamide, lavsan, half wool, denim, raincoat fabric, woven and nonwoven canvas, and mixtures thereof. A preferred thin fabric is denim. Specific leathers include kid leather, lamb leather, pig leather, chamois leather, calf leather, suede and artificial leather.

A variety of different types of designs can be formed on thin fabrics and leathers in accordance with this invention by using a moving or stationary laser and a moving or stationary product. More complex designs can be formed by additionally employing mirrors, lenses, shutters, or combinations thereof. The design can be continuous or discontinuous, straight or curved, and simple or intricate. Thick or thin lines of design can be formed. The designs can be single or multiple color, full or partial penetrating, relief or flat, and combinations thereof. This invention allows for the creation of standard designs typically provided by more expensive means, as well as the creation of entirely new designs that are not possible to achieve by any other means thereby providing new products for expanded market opportunities. For example, the intricate laser designs imparted onto leathers are unique because alternate processes to impart such designs onto leather are rare and totally cost inefficient. This invention can then be used to impart significant design patterns onto car leather interiors, jackets, boots, purses and wallets which are typically only differentiated by color. It is also possible to use this invention to create stencil laser patterns onto thin fabrics and leathers, for example to form monograms on the material.

The designs are formed by impingement of the laser beam on the surface of the thin fabric or leather. The laser beam destroys or changes a small portion of the material or dye. The ratio of the material destroyed or changed to the dye destroyed or changed is a function of the dye composition, quantity and level of fixation, and the material composition and construction such as type and interlacing of fiber. The laser beam can form a design on the material by destroying, melting, shrinking, rumpling, crumpling, creping, watering or crimping the material.

The designed thin fabrics and leathers in accordance with this invention can be used to make novel clothing, footwear, purses and wallets, vehicle interiors, furniture coverings and wall coverings. This invention can offer unique product designs to the fashion industry, footwear market, furniture business, home decorative market, automotive industry, and boat and airline industries.

A surprising benefit of this invention is that thin fabrics and leathers with designs produced by this invention have mechanical properties and chemical stability superior to those products produced by chemical dye processes. Table III illustrates this improvement in chemical stability of the laser designed thin fabrics and leathers. Samples of thin fabrics and leather were subjected to washing and rubbing treatments and then judged for the amount of color retained, uniformity of color, and depth of color. The scores in the table are a relative quality index with 5 being the best rating, essentially equivalent to untreated material. In all cases, the relative quality of the laser designed fabric was equal or superior to the chemical dyed fabric following high temperature soap washing, room temperature washing, and dry and wet friction testing.

TABLE III

Chemical Stability of Laser Design Fabrics and Leather vs. Chemical Design

| Material | Design | SHTW | RTW | DFT | WFT |
|---|---|---|---|---|---|
| Rayon | Chemical | 5 | 4–5 | 4 | 4 |
|  | Laser | 5 | 4–5 | 4–5 | 5 |
| Nylon | Chemical | 5 | 4 | 4 | 4 |
|  | Laser | 5 | 5 | 5 | 5 |
| Nonwoven Canvas | Chemical | 5 | 4 | 4 | 4 |
|  | Laser | 5 | 5 | 5 | 5 |
| Pig Leather | Chemical | 5 |  | 4 | 3–4 |
|  | Laser | 5 |  | 5 | 4–5 |

Design Key:
SHTW = Simulated High Temperature Soap Wash,
RTW = Room Temperature Wash,
DFT = Dry Friction Test,
WFT = Wet Friction Test Table IV illustrates the significant improvement in mechanical properties of the laser designed fabrics versus the conventional designed fabrics. The significant improvement in tensile and elongation properties for the heavy wool laser design is particularly surprising and striking.

TABLE IV

Mechanical Properties of Laser Design Fabrics and Leather vs. Chemical Design

| Material | Design | Load (Kg) Warp | Load (Kg) Woof | Elongation (%) Warp | Elongation (%) Woof |
|---|---|---|---|---|---|
| Rayon | Virgin | 232.4 | 229.7 | 15.2 | 16.9 |
| | Chemical | 230.9 | 229.1 | 14.9 | 16.7 |
| | Laser | 231 | 229.5 | 14.9 | 16.8 |
| Nylon | Virgin | 256.8 | 252.4 | 19.8 | 20.2 |
| | Chemical | 251.4 | 250.3 | 19.2 | 20.0 |
| | Laser | 256.6 | 251.8 | 19.4 | 20.1 |
| Nonwoven Canvas | Virgin | 210.2 | 208.7 | 18.7 | 19.2 |
| | Chemical | 208.9 | 207.4 | 18.2 | 18.8 |
| | Laser | 209.1 | 207.8 | 18.5 | 18.8 |
| Pig Leather | Virgin | 1.4 | | 35 | |
| | Chemical | 1.4 | | 35 | |
| | Laser | 1.4 | | 35 | |
| Heavy Wool | Virgin | 248.8 | 192.1 | 17.2 | 17.3 |
| | Chemical | 111.2 | 46.4 | 5.7 | 5.2 |
| | Laser | 247 | 190.1 | 17 | 17 |

Design Key:
Virgin = No Design,
Chemical = Chemical Design,
Laser = Laser Design.
Sample Size = 50 × 200 mm.

Figure 2:
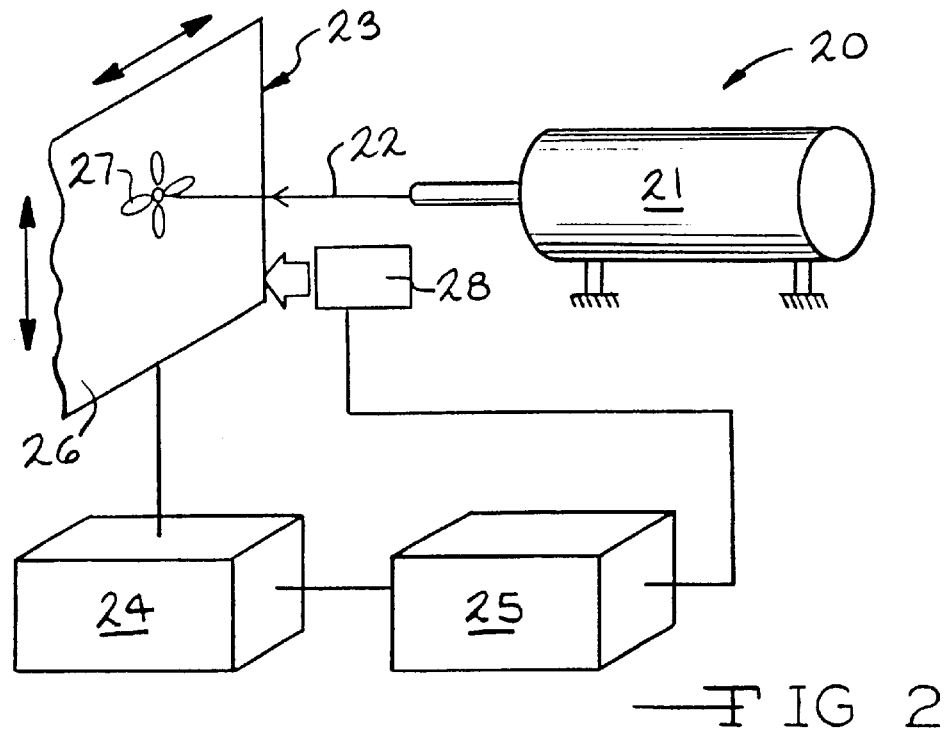

FIGS. 2 through 9 illustrate alternative embodiments of a laser method of forming designs on thin fabrics and leathers in accordance with this invention. Referring now to FIG. 2, there is illustrated a second embodiment which utilizes the apparatus indicated generally at 20. The apparatus 20 includes a laser 21 which generates a laser beam 22. Unlike the first embodiment illustrated in FIG. 1, the laser 21 is not positioned so that it can be moved in the vertical and horizontal directions. Rather, the laser 21 is in a stationary position.

The laser 21 is positioned to generate a laser beam 22 in the direction of a thin fabric 23. A drive mechanism in the form of a product drive 24 is connected to the fabric 23. The product drive 24 is adapted to cause movement of the fabric 23 in the vertical and horizontal directions, as shown by the arrows in the drawing. An electronic controller such as a computer 25 is connected to the product drive 24. The computer 25 is adapted to provide a signal to the product drive 24 to control movement of the fabric 23. The computer 25 is programmed by particular software (not shown) developed to control such movement.

In operation, the laser 21 is activated and generates the laser beam 22 in the direction of the fabric 23. The fabric 23 includes a surface 26. The laser beam 22 contacts the surface 26 of the fabric 23. The computer 25 provides signals to the product drive 24. In response to the signals, the product drive 24 causes movement of the surface 26 of the fabric 23. Movement of the surface 26 of the fabric 23 in contact with the laser beam 22 causes a design 27 to be formed on the surface 26. As described above, the speed of the laser beam 22 relative to the surface 26 of the fabric 23 is controlled within a predetermined range. In this embodiment, the computer 25 provides signals to the product drive 24 to control the specific movements and timing of the fabric 23 to form the specific desired design 27 and to maintain the Critical Operating Speed.

To prevent carbonization, complete melting, and/or burn-through of a fabric 23 in which the thickness varies nonuniformly, a sensor 28 can continuously detect the thickness of the fabric 23 prior to contact with the laser beam 22. The sensor 28 provides a signal to the computer 25, and the computer 25 in turn provides a signal to the product drive 24 to adjust the relative speed in view of the detected thickness. Such thickness sensors are common in the paper making industry.

Figure 3:
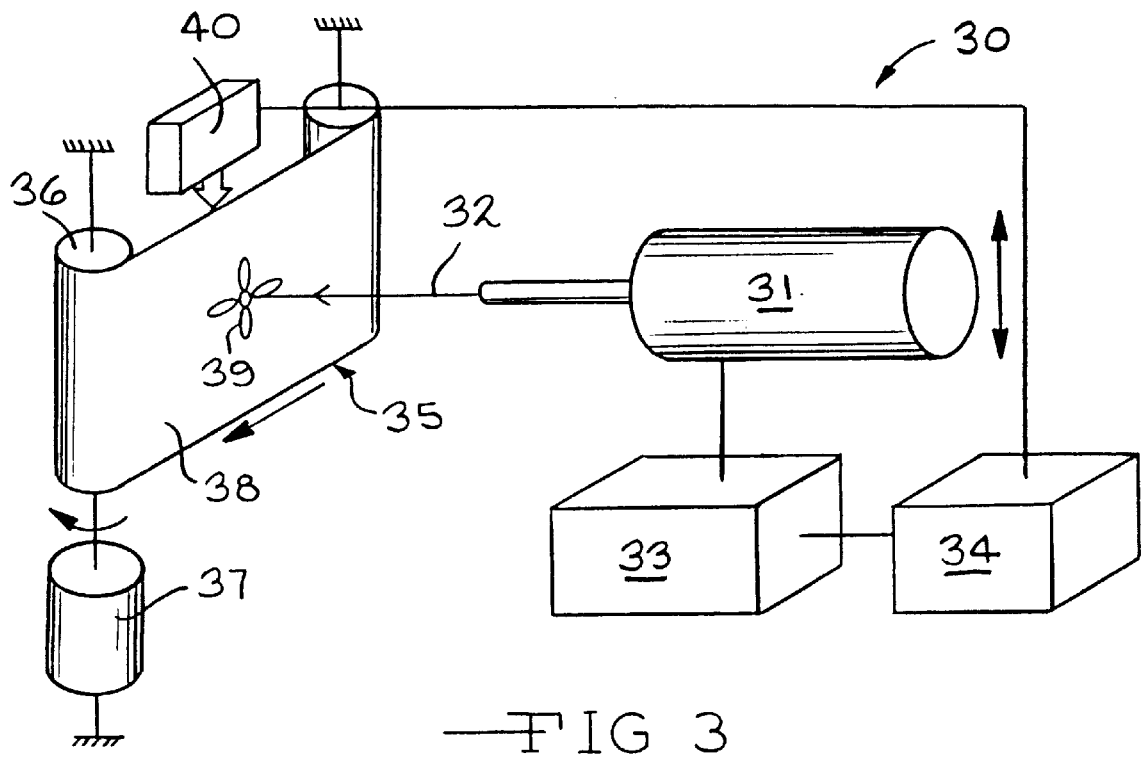

Referring now to FIG. 3, there is illustrated a third embodiment of a laser method of forming designs on thin fabrics and leathers in accordance with this invention. This third embodiment is a continuous method, and as a result is more economical than the first and second embodiments. The method utilizes the apparatus indicated generally at 30. The apparatus 30 includes a laser 31 which generates a laser beam 32. The laser 31 is positioned so that it can be moved in the vertical direction indicated by the arrow in the drawing. Such movement results in a corresponding movement of the laser beam 32. A drive mechanism in the form of a laser drive 33 is connected to the laser 31. The laser drive 33 is adapted to cause movement of the laser 31 in the vertical direction.

An electronic controller such as a computer 34 is connected to the laser drive 33. The computer 34 is adapted to provide a signal to the laser drive 33 to control movement of the laser 31. The computer 34 is programmed by particular software (not shown) developed to control such movement.

The laser 31 is positioned to generate a laser beam 32 in the direction of a thin fabric 35. The fabric 35 is positioned on a moving roll 36. A drive mechanism in the form of a product drive 37 is connected to the moving roll 36. The product drive 37 is adapted to cause rotation of the moving roll 36 and thus continuous movement of the fabric 35 in the horizontal direction, as shown by the arrows in the drawing.

In operation, the laser 31 is activated and generates the laser beam 32 in the direction of the fabric 35. The fabric 35 includes a surface 38. The laser beam 32 contacts the surface 38 of the fabric 35. The computer 34 provides signals to the laser drive 33. In response to the signals, the laser drive 33 causes movement of laser 31 and the laser beam 32. Movement of the laser beam 32 in contact with the moving surface 38 of the fabric 35 causes a design 39 to be formed on the surface 38. As described above, the speed of the laser beam 32 relative to the surface 38 of the fabric 35 is controlled within a predetermined range. In this embodiment, the specific movements and timing of the laser 31 and the fabric roll 36 are coordinated to form the specific desired design 39 and to maintain the Critical Operating Speed. A sensor 40 can continuously detect the thickness of the fabric 35 prior to contact with the laser beam 32 and provide a signal to the computer 34 to adjust the relative speed.

Figure 4:
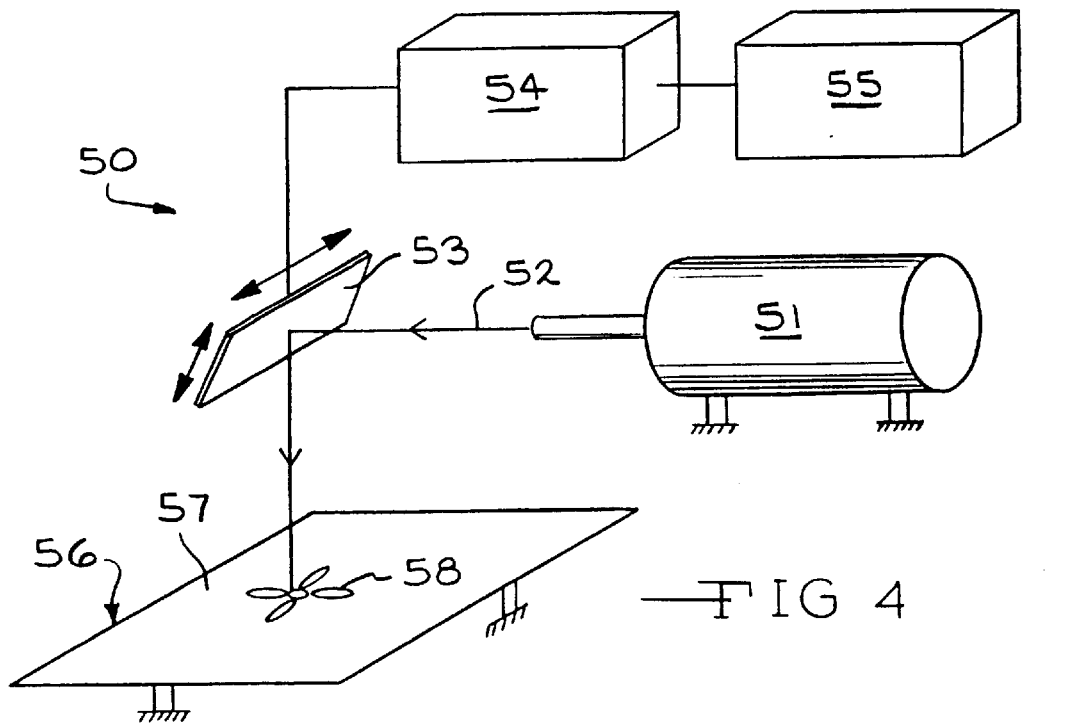

Referring now to FIG. 4, there is illustrated a fourth embodiment of a laser method of forming designs on thin fabrics and leathers in accordance with this invention. Like the third embodiment, this fourth embodiment is a more economical method than the first and second embodiments. The method utilizes the apparatus indicated generally at 50. The apparatus 50 includes a laser 51 which generates a laser beam 52. The laser 51 is in a stationary position.

The laser 51 is positioned to generate a laser beam 52 in the direction of a mirror 53. In turn, the mirror 53 is positioned to deflect the laser beam 52 in the direction of a thin fabric 56. A drive mechanism in the form of a mirror drive 54 is connected to the mirror 53. The mirror drive 54 is adapted to cause movement of the mirror 53 in the vertical and horizontal directions, as shown by the arrows in the drawing. An electronic controller such as a computer 55 is connected to the mirror drive 54. The computer 55 is adapted to provide a signal to the mirror drive 54 to control movement of the mirror 53. The computer 55 is programmed by particular software (not shown) developed to control such movement.

In operation, the laser 41 is activated and generates the laser beam 52 in the direction of the mirror 53. The mirror 53 deflects the laser beam 52 in the direction of the fabric 56. The fabric 56 includes a surface 57. The laser beam 52 contacts the surface 57 of the fabric 56. The computer 55 provides a signal to the mirror drive 54. In response to the signal, the mirror drive 54 causes movement of the mirror 53 which causes movement of the laser beam 52. Movement of the laser beam 52 in contact with the surface 57 of the fabric 56 causes a design 58 to be formed on the surface 57. As described above, the speed of the laser beam 52 relative to the surface 57 of the fabric 56 is controlled within a predetermined range. In this embodiment, the specific movements and timing of the mirror 53 form the specific desired design 58 and maintain the Critical Operating Speed.

Figure 5:
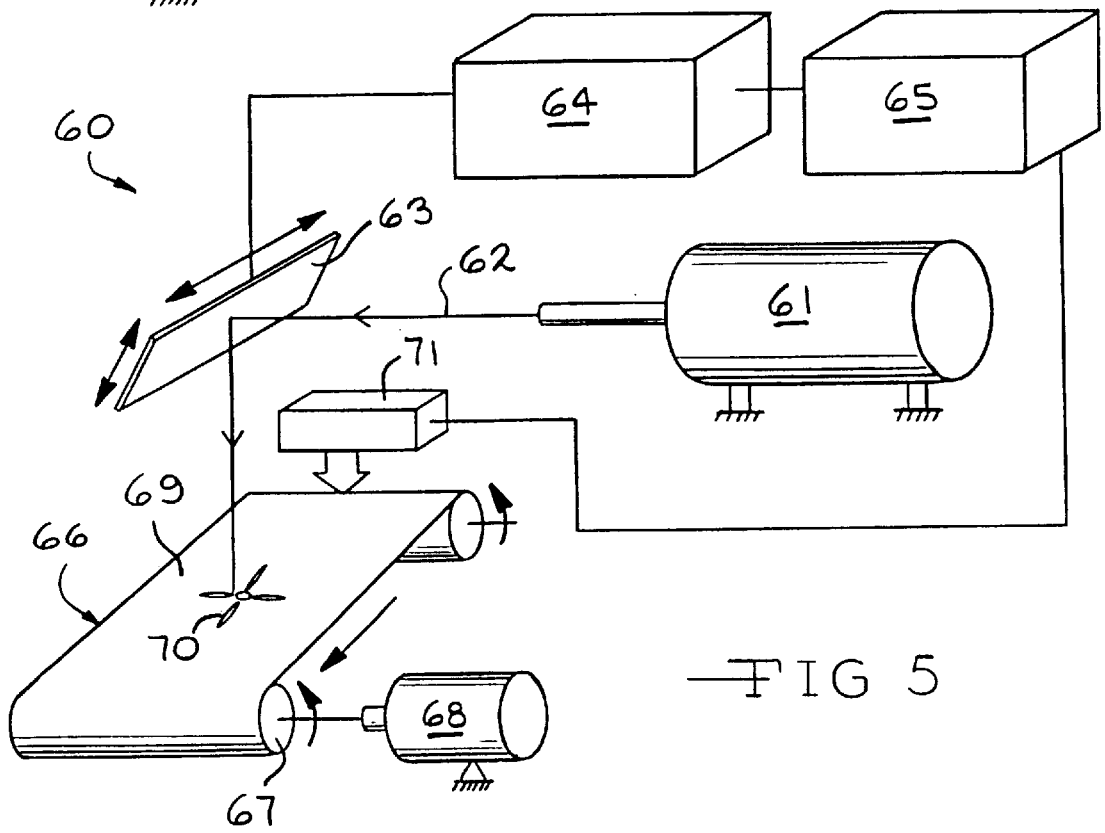

Referring now to FIG. 5, there is illustrated a fifth embodiment of a laser method of forming designs on thin fabrics and leathers in accordance with this invention. This fifth embodiment combines the methods of the third and fourth embodiments and is thus an even more economical method. The method utilizes the apparatus indicated generally at 60. The apparatus 60 includes a laser 61 which generates a laser beam 62. The laser 61 is in a stationary position.

The laser 61 is positioned to generate a laser beam 62 in the direction of a mirror 63. A drive mechanism in the form of a mirror drive 64 is connected to the mirror 63. The mirror drive 64 is adapted to cause movement of the mirror 63 in the vertical and horizontal directions, as shown by the arrows in the drawing. An electronic controller such as a computer 65 is connected to the mirror drive 64. The computer 65 is adapted to provide a signal to the mirror drive 64 to control movement of the mirror 63. The computer 65 is programmed by particular software (not shown) developed to control such movement.

In turn, the mirror 63 is positioned to deflect the laser beam 62 in the direction of a thin fabric 66. The fabric 66 is positioned on a moving roll 67. A drive mechanism in the form of a product drive 68 is connected to the moving roll 67. The product drive 68 is adapted to cause rotation of the moving roll 67 and thus continuous movement of the fabric 66 in the horizontal direction, as shown by the arrows in the drawing.

In operation, the laser 61 is activated and generates the laser beam 62 in the direction of the mirror 63. The mirror 63 deflects the laser beam 62 in the direction of the fabric 66. The fabric 66 includes a surface 69. The laser beam 62 contacts the surface 69 of the fabric 66. The computer 65 provides a signal to the mirror drive 64. In response to the signal, the mirror drive 64 causes movement of the mirror 63 which causes movement of the laser beam 62. Movement of the laser beam 62 in contact with the moving surface 69 of the fabric 66 causes a design 70 to be formed on the surface 69. As described above, the speed of the laser beam 62 relative to the surface 69 of the fabric 66 is controlled within a predetermined range. In this embodiment, the specific movements and timing of the mirror 63 and the product roll 67 are coordinated to form the specific desired design 70 and maintain the Critical Operating Speed. A sensor 71 can continuously detect the thickness of the fabric 66 prior to contact with the laser beam 62 and provide a signal to the computer 65 to adjust the relative speed.

Figure 6:
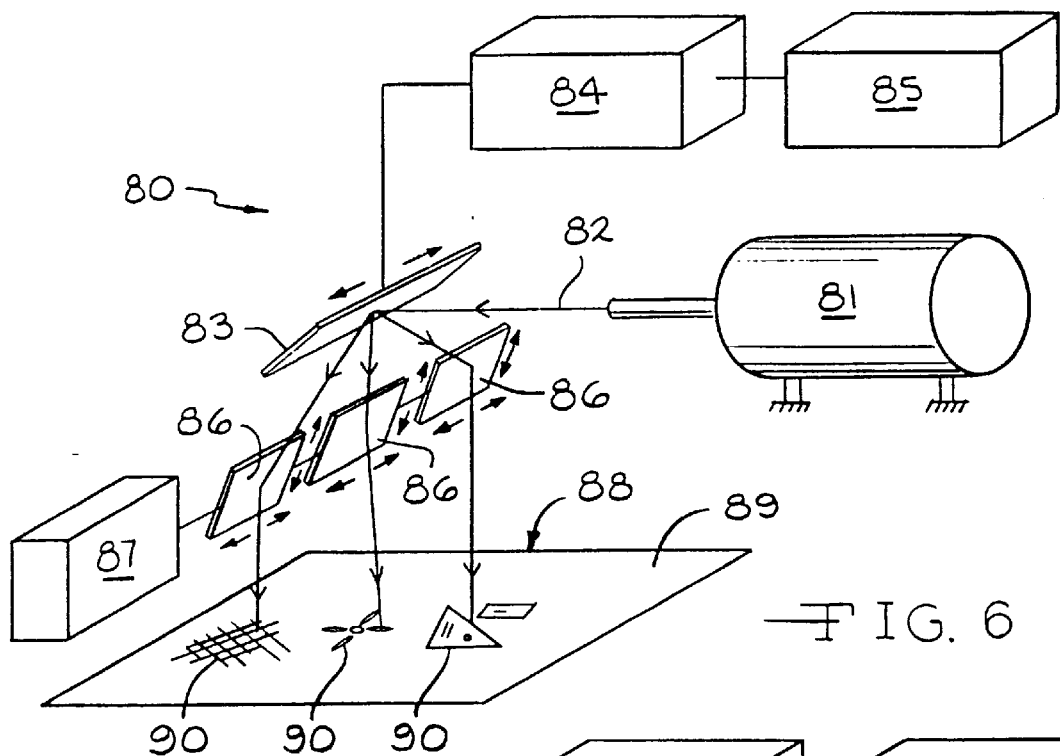

Referring now to FIG. 6, there is illustrated a sixth embodiment of a laser method of forming designs on thin fabrics and leathers in accordance with this invention. The method utilizes the apparatus indicated generally at 80. The apparatus 80 includes a laser 81 which generates a laser beam 82. The laser 81 is in a stationary position.

The laser 81 is positioned to generate a laser beam 82 in the direction of a primary mirror 83. A drive mechanism in the form of a primary mirror drive 84 is connected to the primary mirror 83. The primary mirror drive 84 is adapted to cause movement of the primary mirror 83 in the horizontal direction, as shown by the arrow in the drawing. An electronic controller such as a computer 85 is connected to the primary mirror drive 84. The computer 85 is adapted to provide a signal to the primary mirror drive 84 to control movement of the primary mirror 83. The computer 85 is programmed by particular software (not shown) developed to control such movement.

By moving horizontally, the primary mirror 83 is positioned to deflect the laser beam 82 in the direction of a plurality of secondary mirrors 86. A drive mechanism in the form of a secondary mirror drive 87 is connected to the secondary mirrors 86. The secondary mirror drive 87 is adapted to cause movement of the secondary mirrors 86 in the vertical and horizontal directions, as shown by the arrows. Each secondary mirror 86 is positioned to deflect the laser beam 82 in the direction of a different portion of a thin fabric 88, thereby spreading the laser beam 82 over the fabric 88.

In operation, the laser 81 is activated and generates the laser beam 82 in the direction of the primary mirror 83. The computer 85 provides a signal to the primary mirror drive 84. In response to the signal, the primary mirror drive 84 causes movement of the primary mirror 83 in the horizontal direction. As the primary mirror 83 moves horizontally, the laser beam 82 is deflected against each of the secondary mirrors 86. Each of the secondary mirrors 86, in turn, deflects the laser beam 82 in the direction of a portion of the fabric 88. The fabric 88 includes a surface 89. The laser beam 82 contacts each portion of the surface 89 of the fabric 88. The secondary mirror drive 87 causes movement of each of the secondary mirrors 86 in the vertical and horizontal directions, which causes a corresponding movement of the laser beam 82. Movement of the laser beam 82 in contact with each portion of the surface 89 of the fabric 88 causes a plurality of designs 90 to be formed on the surface 89. As described above, the speed of the laser beam 82 relative to the surface 89 of the fabric 88 is controlled within a predetermined range. In this embodiment, the specific movements and timing of the secondary mirrors 86 form the specific desired designs 90 and maintain the Critical Operating Speed.

Figure 7:
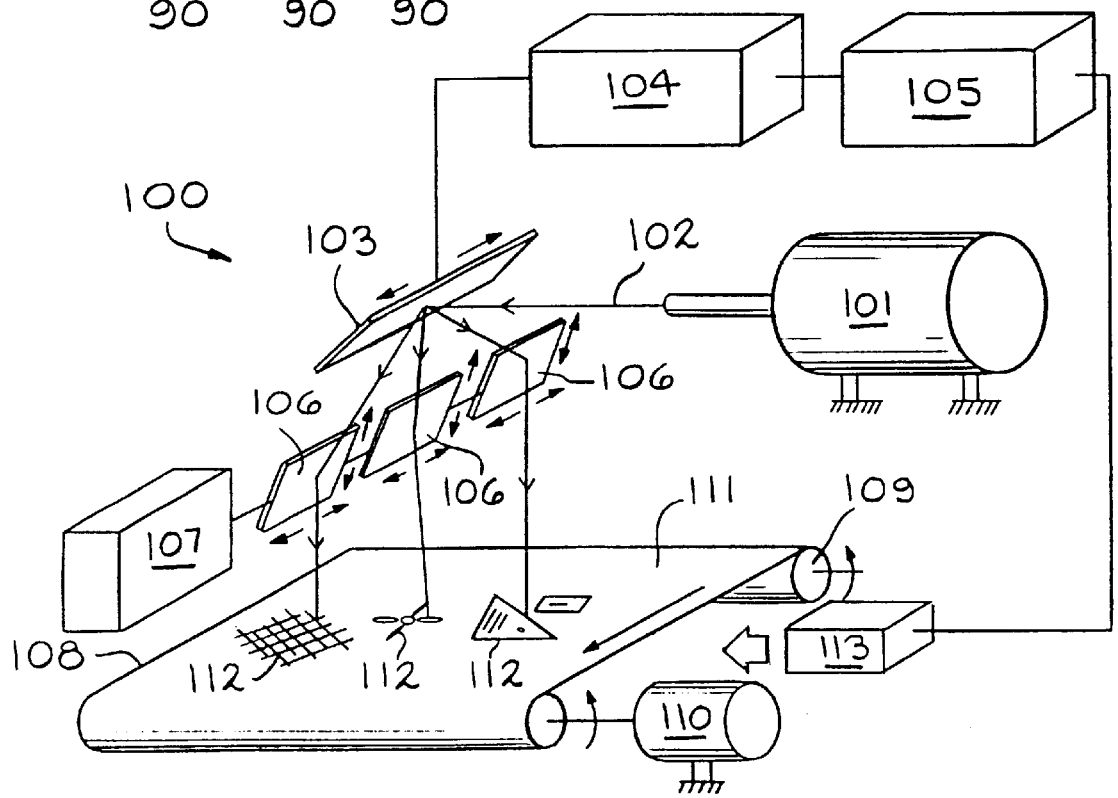

Referring now to FIG. 7, there is illustrated a seventh embodiment of a laser method of forming designs on thin fabrics and leathers in accordance with this invention. The method utilizes the apparatus indicated generally at 100. The apparatus 100 includes a laser 101 which generates a laser beam 102. The laser 101 is in a stationary position.

The laser 101 is positioned to generate a laser beam 102 in the direction of a primary mirror 103. A drive mechanism in the form of a primary mirror drive 104 is connected to the primary mirror 103. The primary mirror drive 104 is adapted to cause movement of the primary mirror 103 in the horizontal direction, as shown by the arrow in the drawing. An electronic controller such as a computer 105 is connected to the primary mirror drive 104. The computer 105 is adapted to provide a signal to the primary mirror drive 104 to control movement of the primary mirror 103. The computer 105 is programmed by particular software (not shown) developed to control such movement.

By moving horizontally, the primary mirror 103 is positioned to deflect the laser beam 102 in the direction of a plurality of secondary mirrors 106. A drive mechanism in the form of a secondary mirror drive 107 is connected to the secondary mirrors 106. The secondary mirror drive 107 is adapted to cause movement of the secondary mirrors 106 in the vertical and horizontal directions, as shown by the arrows. Each secondary mirror 106 is positioned to deflect the laser beam 102 in the direction of a different portion of a thin fabric 108, thereby spreading the laser beam 102 over the fabric 108.

The fabric 108 is positioned on a moving roll 109. A drive mechanism in the form of a product drive 110 is connected to the moving roll 109. The product drive 110 is adapted to cause rotation of the moving roll 109 and thus continuous movement of the fabric 108 in the horizontal direction, as shown by the arrows in the drawing.

In operation, the laser 101 is activated and generates the laser beam 102 in the direction of the primary mirror 103. The computer 105 provides a signal to the primary mirror drive 104. In response to the signal, the primary mirror drive 104 causes movement of the primary mirror 103 in the horizontal direction. As the primary mirror 103 moves horizontally, the laser beam 102 is deflected against each of the secondary mirrors 106. Each of the secondary mirrors 106, in turn, deflects the laser beam 102 in the direction of a portion of the fabric 108. The fabric 108 includes a surface 111. The laser beam 102 contacts each portion of the surface 111 of the fabric 108. The secondary mirror drive 107 causes movement of each of the secondary mirrors 106 in the vertical and horizontal directions, which causes a corresponding movement of the laser beam 102. Movement of the laser beam 102 in contact with each portion of the surface 111 of the moving fabric 108 causes a plurality of designs 112 to be formed on the surface 111. As described above, the speed of the laser beam 102 relative to the surface 111 of the fabric 108 is controlled within a predetermined range. In this embodiment, the specific movements and timing of the secondary mirrors 106 and the product roll 109 are coordinated to form the specific desired designs 112 and maintain the Critical Operating Speed. This embodiment employing a moving product roll in combination with a plurality of lenses to spread the laser beam over the fabric 108 is particularly economical. A sensor 113 can continuously detect the thickness of the fabric 108 prior to contact with the laser beam 102 and provide a signal to the computer 105 to adjust the relative speed.

Figure 8:
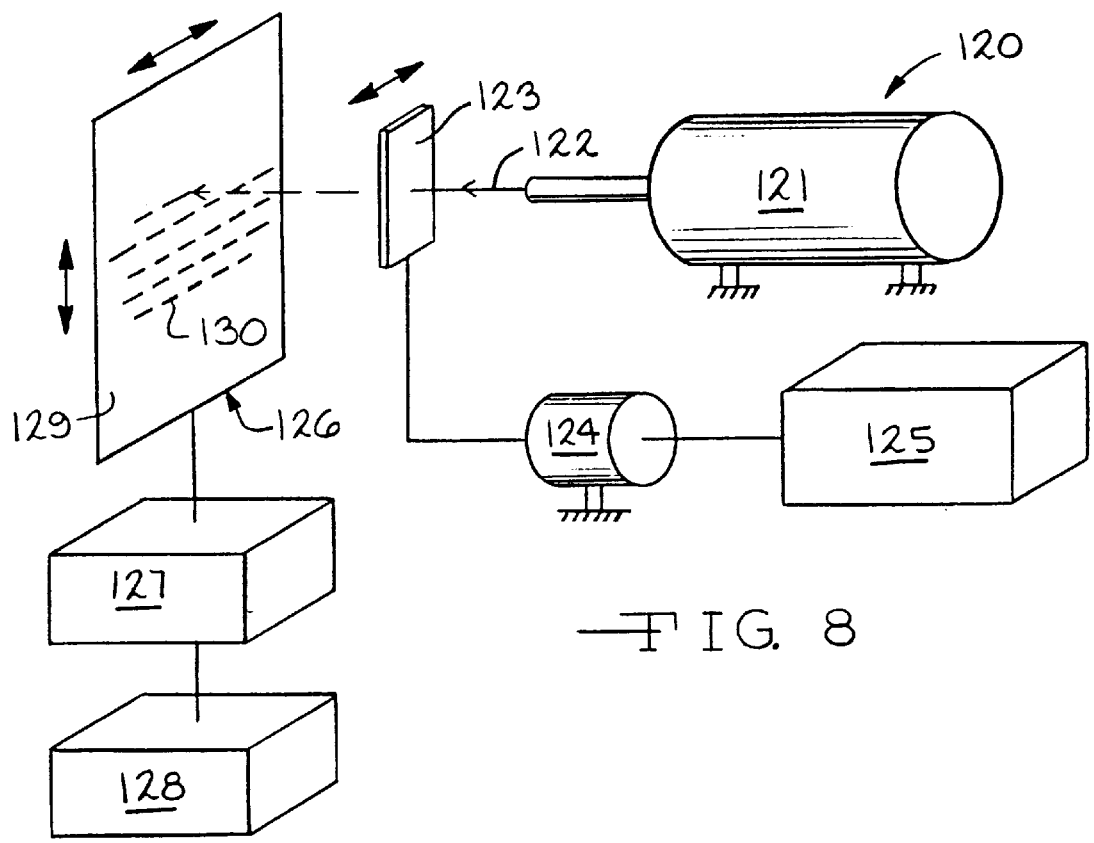

Referring now to FIG. 8, there is illustrated an eighth embodiment of a laser method of forming designs on thin fabrics and leathers in accordance with this invention. The method utilizes the apparatus indicated generally at 120. The apparatus 120 includes a laser 121 which generates a laser beam 122. The laser 121 is in a stationary position. The laser beam 122 is directed toward a shutter 123. The shutter 123 periodically interrupts the laser beam 122 by swinging back and forth perpendicular to the direction of the laser beam. A drive mechanism in the form of a shutter drive 124 is connected to the shutter 123. The shutter drive 124 is adapted to cause the shutter 123 to swing back and forth. The shutter could also move in different directions to periodically interrupt the laser beam. Alternatively, the shutter could be constructed and operate similar to the shutter of a camera which periodically opens and closes.

An electronic controller such as a computer 125 is connected to the shutter drive 124. The computer 125 is adapted to provide a signal to the shutter drive 124 to control movement of the shutter 123. The computer 125 is programmed by particular software (not shown) developed to control such movement to interrupt the laser beam at desired intervals.

The laser 121 is positioned to generate a laser beam 122 past the shutter 123 in the direction of a thin fabric 126. A drive mechanism in the form of a product drive 127 is connected to the fabric 126. The product drive 127 is adapted to cause movement of the fabric 126 in the vertical and horizontal directions, as shown by the arrows in the drawing. An electronic controller such as a computer 128 is connected to the product drive 127. The computer 128 is adapted to provide a signal to the product drive 127 to control movement of the fabric 126. The computer 128 is programmed by particular software (not shown) developed to control such movement.

In operation, the laser 121 is activated and generates the laser beam 122 in the direction of the shutter 123. The computer 125 provides a signal to the shutter drive 124. In response to the signal, the shutter drive 124 causes movement of the shutter 123 to periodically interrupt the laser beam 122. The laser beam 122 is directed past the shutter 123 in the direction of the fabric 126. The fabric 126 includes a surface 129. The laser beam 122 contacts the surface 129 of the fabric 126. The computer 128 provides a signal to the product drive 127. In response to the signal, the product drive 127 causes movement of the surface 129 of the fabric 126. Movement of the surface 129 of the fabric 126 in contact with the laser beam 122, in combination with the periodic interruption of the laser beam 122 by the shutter 123, causes a discontinuous design 130 to be formed on the surface 129.

Figure 9:
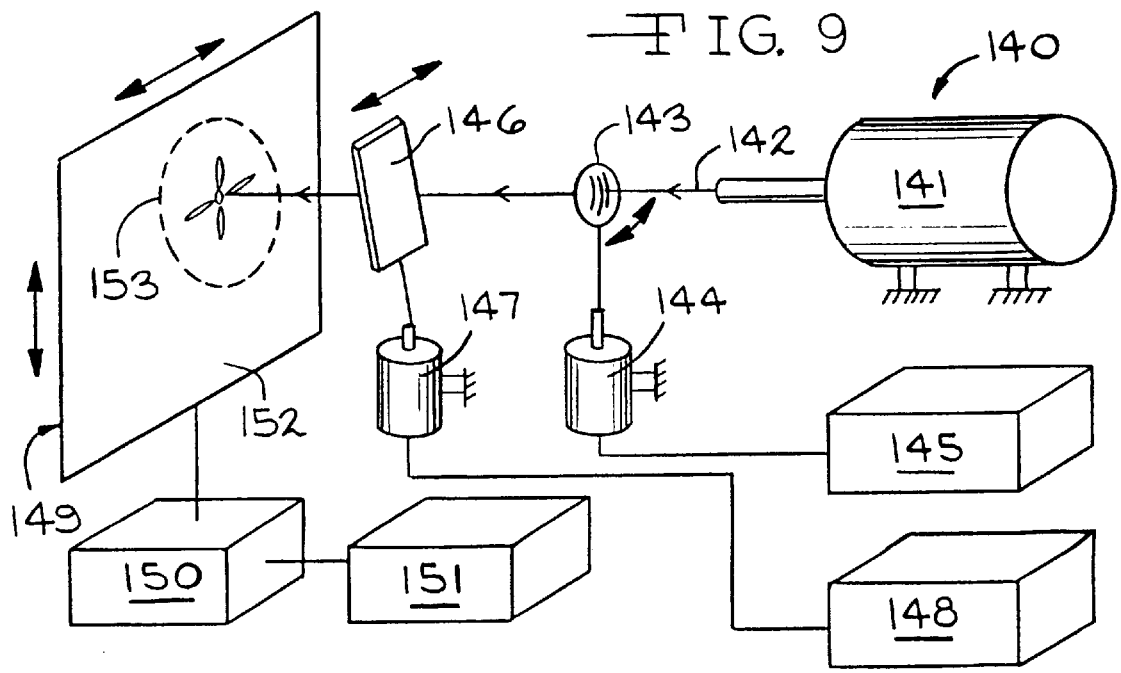

Referring now to FIG. 9, there is illustrated an ninth embodiment of a laser method of forming designs on thin fabrics and leathers in accordance with this invention. The method utilizes the apparatus indicated generally at 140. The apparatus 140 includes a laser 141 which generates a laser beam 142. The laser 141 is in a stationary position.

The laser beam 142 is directed through a lens 143. The lens 143 serves to redirect the laser beam 142 in a manner that results in a more complex curved design. The lens 143 can be rotated for different redirections of the laser beam 142, as shown by the arrow in the drawing. The lens 143 can also be moved laterally or can rotate on its vertical axis for different effects, such as to create thick or thin lines. A drive mechanism in the form of a lens drive 144 is connected to the lens 143. The lens drive 144 is adapted to cause rotation of the lens 143.

An electronic controller such as a computer 145 is connected to the lens drive 144. The computer 145 is adapted to provide a signal to the lens drive 144 to control rotation of the lens 143. The computer 145 is programmed by particular software (not shown) developed to control such rotation.

The laser beam 142 is then directed toward a shutter 146. The shutter 146 periodically interrupts the laser beam 142 by swinging back and forth perpendicular to the direction of the laser beam. A drive mechanism in the form of a shutter drive 147 is connected to the shutter 146. The shutter drive 147 is adapted to cause the shutter 146 to swing back and forth.

An electronic controller such as a computer 148 is connected to the shutter drive 147. The computer 148 is adapted to provide a signal to the shutter drive 147 to control movement of the shutter 146. The computer 148 is programmed by particular software (not shown) developed to control such movement to interrupt the laser beam at desired intervals.

The laser 141 is positioned to generate a laser beam 142 through the lens 143, past the shutter 146, and in the direction of a thin fabric 149. A drive mechanism in the form of a product drive 150 is connected to the fabric 149. The product drive 150 is adapted to cause movement of the fabric 149 in the vertical and horizontal directions, as shown by the arrows in the drawing. An electronic controller such as a computer 151 is connected to the product drive 150. The computer 151 is adapted to provide a signal to the product drive 150 to control movement of the fabric 149. The computer 151 is programmed by particular software (not shown) developed to control such movement.

In operation, the laser 141 is activated and generates the laser beam 142 in the direction of the lens 143. The computer 145 provides a signal to the lens drive 144. In response to the signal, the lens drive 144 causes rotation of the lens 143 to the desired position. The laser beam 142 is directed through the lens 143 in the direction of the shutter 146. The computer 148 provides a signal to the shutter drive 147. In response to the signal, the shutter drive 147 causes movement of the shutter 146 to periodically interrupt the laser beam. The laser beam 142 is then directed past the shutter 146 in the direction of the fabric 149. The fabric 149 includes a surface 152. The laser beam 142 contacts the surface 152 of the fabric 149. The computer 151 provides a signal to the product drive 150. In response to the signal, the product drive 150 causes movement of the surface 152 of the fabric 149. Movement of the surface 152 of the fabric 149 in contact with the laser beam 142, in combination with the rotation of the lens 143 and the periodic interruption of the laser beam 142 by the shutter 146, causes a design 153 to be formed on the surface 152. The design 153 includes complex continuous and discontinuous design portions.

Figure 10:
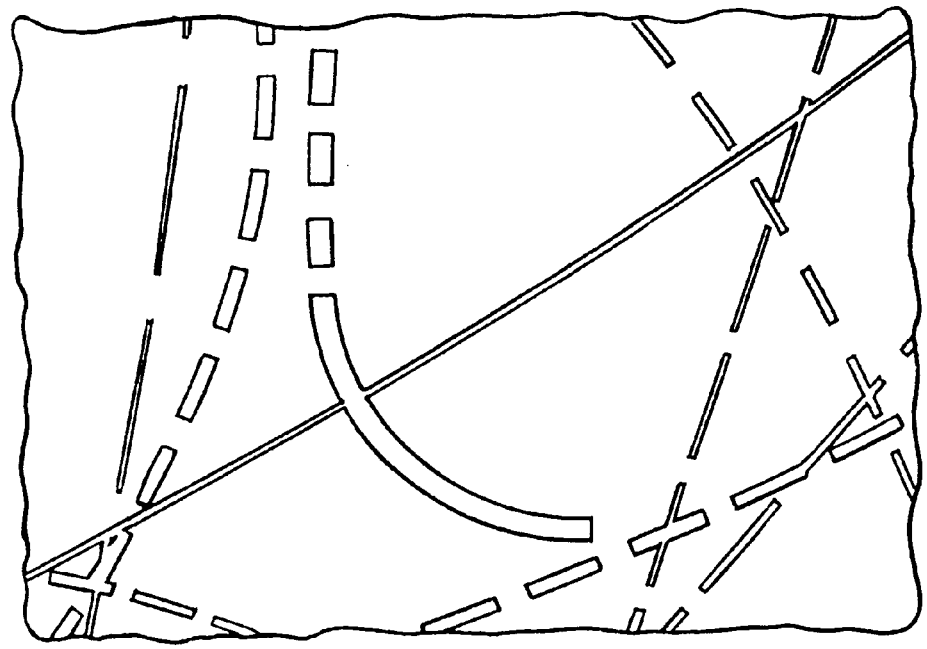
FIG. 10 illustrates a laser design formed on denim fabric in accordance with this invention.
Figure 11:
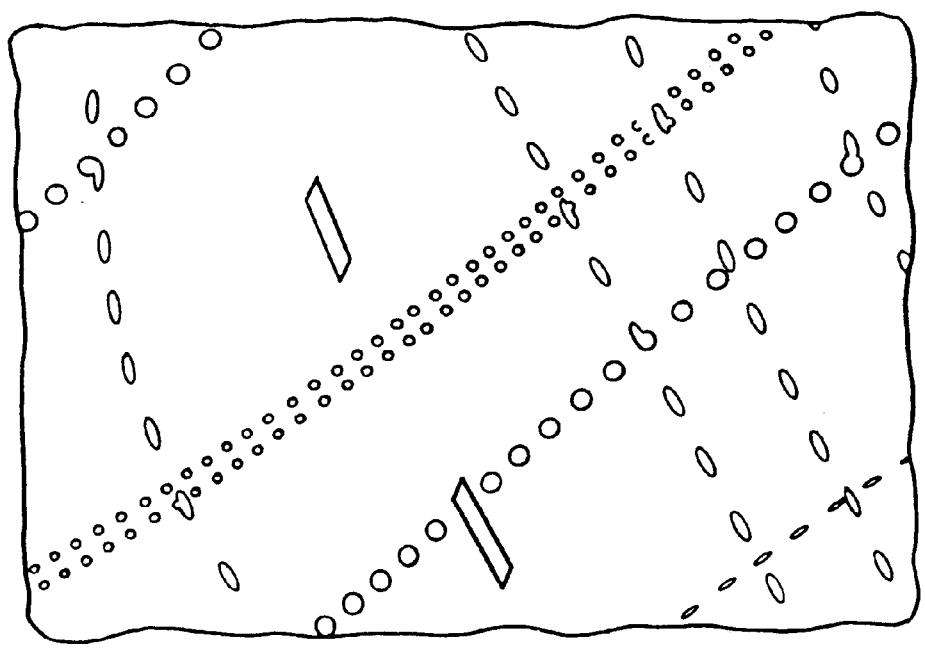
FIG. 11 illustrates a laser design formed on leather in accordance with this invention.

FIGS. 10 and 11 are drawings of laser designs formed on a thin fabrics and a leather in accordance with this invention. They demonstrate that a variety of different designs can be formed on a variety of different thin fabrics and leathers without carbonization or burn-through.

FIG. 10 illustrates a novel and attractive laser design formed on denim or jean fabric. This design includes thick and thin, continuous and discontinuous, and straight and curved lines. This new fashion concept is expected to be popular with consumers who purchase jeans.

A design formed on pig leather is illustrated in FIG. 11. Such laser designs formed on leathers are unique in and of themselves since alternate processes to impart designs onto leather are rare and totally cost inefficient. This invention can thus be used to form designs onto vehicle leather interiors, jackets, boots, wallets and purses which are typically only differentiated by color.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A method of using a laser for forming a design on a product selected from the group consisting of fabrics and leathers, comprising:

determining, for a specific material of the product, a maximum speed of said specific material relative to the laser, for a given laser power, that will result in a perceivable change for a given laser power, that will result in a perceivable change being formed to said product, and a threshold speed below which at least one of carbonization, undesired burn through or undesired melting of the material of the product will occur; and contacting a surface of said product with the laser beam to form a design on said surface which changes the surface of the material, and controlling the speed of said laser beam relative to said surface to a range between said maximum speed and said threshold speed.

2. The method described in claim 1 wherein an electronic controller provides a signal to a drive mechanism to control said relative speed.

3. The method described in claim 2 wherein said drive mechanism controls movement of said laser.

4. The method described in claim 2 wherein said drive mechanism controls movement of said product.

5. The method described in claim 4 wherein said drive mechanism controls movement of said product on a roll.

6. A method described in claim 4 further comprising detecting a thickness of said product prior to said contact and providing a signal to said electronic controller to adjust said relative speed.

7. The method described in claim 2 wherein said electronic controller provides signals to a plurality of drive mechanisms to control said relative speed, and wherein said drive mechanisms control movement of a combination of devices selected from the group consisting of said laser, said product, a mirror and a lens.

8. The method described in claim 2 wherein said drive mechanism controls movement of a mirror.

9. The method described in claim 8 wherein said drive mechanism controls movement of a primary mirror and a plurality of secondary mirrors.

10. The method described in claim 2 wherein said drive mechanism controls movement of a lens.

11. The method described in claim 1 wherein said electronic controller is a computer programmed by software to control said relative speed.

12. The method described in claim 1 wherein said laser beam is modulated.

13. The method described in claim 1 wherein a shutter periodically interrupts said laser beam.

14. The method described in claim 1 wherein said fabrics are selected from the group consisting of cotton, rayon, nylon, wool, natural and artificial silk, acetate, flax, polyamide, lavsan, half wool, denim, raincoat fabric, woven and nonwoven canvas, and mixtures thereof.

15. The method described in claim 14 wherein said thin fabric is denim.

16. The method described in claim 1 wherein said leathers are selected from the group consisting of kid leather, lamb leather, pig leather, chamois leather, calf leather, suede and artificial leather.

17. The method described in claim 1 wherein said relative speed is between about 0.01 meters/second and about 1.5 meters/second.

18. The method described in claim 1 wherein said product is selected from the group consisting of rayon silk, nylon silk, raincoat fabric, and shirt and chemise fabric, and wherein said relative speed is between about 0.01 meters/second and about 1.5 meters/second.

19. The method described in claim 18 wherein said relative speed is between about 1.0 meters/second and about 1.4 meters/second.

20. The method described in claim 1 wherein said product is selected from the group consisting of 50% cotton/50% polyamide fabric and denim, and wherein said relative speed is between about 0.01 meters/second and about 1.5 meters/second.

21. The method described in claim 20 wherein said relative speed is between about 0.8 meters/second and about 1.2 meters/second.

22. The method described in claim 1 wherein said product is selected from the group consisting of artificial leather and pig leather, and wherein said relative speed is between about 0.01 meters/second and about 1.5 meters/second.

23. The method described in claim 22 wherein said relative speed is between about 0.03 meters/second and about 0.07 meters/second.

24. The method described in claim 1 wherein said surface is contacted by a laser beam generated by a $CO_2$ laser at a distance between about 0.08 meters and about 0.5 meters from said surface, wherein said laser has a radiation capacity between about 5 watts and about 150 watts, and wherein said laser beam has a wavelength of about 10.6 micrometers.

25. A method as in claim 1, wherein said contacting operates to form a design on said surface which causes a change in surface height of at least a portion of the surface.

26. A material marking apparatus, comprising:
a marking surface, adapted in operation to hold a material to be marked;
a laser device, producing a laser beam, said laser device being placed with its output facing said marking surface, and said laser beam being directed toward a location on said marking surface;
a drive mechanism, operating to change a position of said laser beam on said marking surface according to an applied command; and
a controller, connected to said drive mechanism and automatically producing said command to control said position of said laser beam on said marking surface, said controller controlling said drive mechanism to automatically control a speed of movement of said laser beam on said marking surface to a critical operating speed, said critical operating speed being dependent on the specific characteristics of the material being used, and being between a) a threshold speed where the laser beam will undesirably damage the material by one of undesirably fully penetrating the material, carbonization of the material, undesired melting or undesired burn-through of the material, and b) a maximum speed above which a desired imprint will not be formed on the material, to thereby change a surface of the material to a desired pattern on said material without undesired damage.

27. An apparatus as in claim 26 wherein said drive mechanism is a driving element coupled to move the laser, and wherein the controller includes a pre-stored program indicative of said desired pattern, said controller providing information to said driving element indicating with specific movement and timing information necessary to form said desired pattern based on said prestored program, said movement occurring at said critical operating speed.

28. An apparatus as in claim 26, further comprising a thickness sensor, operating to automatically sense a thickness of said material upon which said critical operating speed is determined, and providing an output to said controller, said controller including an element for operating to adjust said critical operating speed based on the thickness sensed by said sensor, and to produce said command to control said drive mechanism to move said laser beam on said material to said critical operating speed determined based on said characteristic which was automatically sensed.

29. An apparatus as in claim 26, wherein said critical operating speed is a speed that creates a design on said surface which causes a change in surface height of at least a portion of the surface.

30. An apparatus as in claim 26, further comprising a characteristic sensor, operating to automatically sense a characteristic of said material upon which said critical operating speed is determined, and providing an output to said controller, said controller including an element for operating to adjust said critical operating speed based on the characteristic sensed by said sensor, and to produce said command to control said drive mechanism to move said laser beam on said material to said critical operating speed determined based on said characteristic which was automatically sensed.

31. An apparatus as in claim 26 wherein said controller determines said critical operating speed as a function of all of a) a particular material being used, b) a thickness of the material, c) power and wavelength of the laser, d) distance between the laser and the material, and e) a particular design being formed.

32. An apparatus as in claim 26 wherein said drive mechanism is a driving element coupled to move the laser, and wherein the controller includes a pre-stored program indicative of said desired pattern, said controller providing information to said driving element indicating with specific movement and timing information necessary to form said desired pattern based on said prestored program, said movement occurring at said critical operating speed.

33. An apparatus as in claim 32 wherein said marking surface includes a roll having an outer surface including material thereon, and wherein said drive mechanism is a product drive connected to rotate said roll, said controller connected to said product drive to control a speed of movement of the roll.

34. An apparatus as in claim 33 wherein said drive mechanism further comprises a laser moving element, moving said laser relative to said roll, said controller controlling movement of said roll to control a first dimension of movement of the laser beam, and controlling a second dimension of movement of the laser beam by moving said laser.

35. An apparatus as in claim 33, further comprising a mirror, and said drive mechanism is also attached to said mirror, said mirror placed in a path of said laser beam to deflect said laser beam towards said marking surface, movement of said laser beam in a first dimension being controlled by movement of said roll and movement of said laser beam in a second direction being controlled by moving said mirror.

36. An apparatus as in claim 35, wherein said characteristic is thickness of the material, and said sensor is a thickness sensor.

37. An apparatus as in claim 35 wherein said mirror is a primary mirror and further comprising at least one secondary mirror, and at least one drive mechanism associated with said secondary mirror, said primary mirror controlling movement of said laser in a first direction and said secondary mirror controlling movement of the laser in the direction of a different position of the material, thereby spreading the laser relative to the material.

38. An apparatus as in claim 26 wherein said drive mechanism is a product drive coupled to move said marking surface, and wherein the controller includes a pre-stored program indicative of said desired pattern, said controller providing information to said driving element indicating with specific movement and timing information necessary to form said desired pattern based on said prestored program.

39. An apparatus as in claim 26 further comprising a mirror, positioned to receive said laser beam and to deflect said laser beam,
wherein said drive mechanism comprises a mirror drive, connected to said mirror and moving said mirror to move in vertical and horizontal directions based on commands from said controller, wherein said controller controls said mirror drive to move in said directions to move the laser beam on the marking surface at said critical operating speed to locations based on said stored program.

40. An apparatus as in claim 39 further comprising a second mirror operating to spread the laser beam over the marking surface.

41. An apparatus as in claim 26 further comprising a shutter, positioned in a path of the laser beam, and operating to periodically interrupt the laser beam from reaching said marking surface, said shutter including a first shutter portion which does not interrupt the laser beam, a second shutter portion which does interrupt the laser beam, and a movement mechanism which moves said shutter between positions where said first shutter portion and said second shutter portion are in the beam of light, periodically interrupt passage of the laser beam.

42. An apparatus as in claim 41 wherein said controller includes a program which indicates areas on the marking surface where portions of the patterns are not desired to be formed, and which commands said shutter to use said second portion to block said laser beam at said locations where said pattern portions are not being formed and commands said shutter to use said first portion to pass said laser beam at locations where said design is being formed.

43. An apparatus as in claim 26 further comprising a lens, coupled to receive an output of said laser beam, and coupling said laser beam toward said marking surface.

44. An apparatus as in claim 43 further comprising a drive mechanism, coupled to said lens, and operating to move said lens.

45. An apparatus as in claim 44 wherein said drive mechanism operates to rotate said lens, and laterally move said lens.

46. A material marking apparatus, comprising:
a marking surface, adapted in operation to hold a material to be marked;
a laser device, having an output beam which is directed toward a spot on said marking surface;
a drive mechanism, changing a relative position between said laser beam and said marking surface, according to an applied command;
a controller connected to said drive mechanism to command movement of said drive mechanism to a relative position between said marking surface and said laser beam, said controller controlling a speed between said marking surface and said laser beam to a critical operating speed within a predetermined range between a) a threshold speed where the laser beam results in undesired damage to the material and b) a maximum speed where the laser beam does not produce altering to a surface of the material, to thereby form a change to said material without undesirably damaging said material;
a material sensing element, operating to automatically sense a characteristic of said material which affects a propensity of said material to be altered by said laser beam; and
said controller also being responsive to said characteristic that is sensed by said material sensing element, and said controller altering said critical operating speed based on changes in said material characteristic, to control said laser to alter the surface of the material.

47. An apparatus as in claim 46, wherein said critical operating speed is a speed that creates a design on said surface which causes a change in surface height of at least a portion of the surface, and wherein said change to said material is a change to said surface height.

48. An apparatus as in claim 46 wherein said material sensing element is a thickness sensor and said characteristic is thickness.

49. An apparatus as in claim 48 wherein said computer controls said drive mechanism to maintain a speed automatically controlling said position of said laser beam on said marking surface, said controller controlling a speed of movement of said laser beam on said marking surface within a predetermined range, said speed of movement controlled to a critical operating speed, said critical operating speed being between a threshold speed where the laser beam damages the material by one of fully penetrating the material, carbonization of the material, melting or burn-through of the material, and a maximum speed beyond which a desired imprint will not be formed on the material, to thereby print a desired pattern on said material.

50. A method of forming a pattern on a material, comprising:
providing a laser beam which shines on a material to be processed;
moving a position of said laser beam relative to said material;
sensing a characteristic of said material; and
using a computer to adjust a speed of said laser beam relative to said material, said computer maintaining said speed at a critical operating speed that is between a maximum speed beyond which a desired pattern will not be formed on said material, and a minimum operating speed below which undesired damage to the material will result, and said computer responsive to said characteristic sensed by said sensing to determine said critical operating speed at which the laser beam is driven relative to the material, whereby an operation on a first material with a first characteristic is operated at a different relative speed than an operation on a second material with a second characteristic different than said first characteristic.

51. A method as in claim 50 wherein said characteristic being sensed is thickness, wherein said characteristic is automatically sensed, and wherein said different operating speed is used for a material having a first thickness compared with a material having said second thickness.

52. A method as in claim 50, wherein said critical operating speed is a speed that creates a design on said surface which causes a change in surface height of at least a portion of the surface, and further comprising changing a surface height of said material by scanning said laser at said critical operating speed.

53. A method of forming a discontinuous design on a material, comprising:
providing a material and a laser beam;
selectively allowing said laser beam to pass to said material, based on an applied command;
selectively moving said laser beam relative to the material based on an applied command; and
storing a pattern forming program in an automatic controller, said pattern forming program including information indicative of a discontinuous pattern to be formed on the material, said discontinuous pattern including at least two unconnected parts, and producing said commands for said allowing said laser beam to pass to said material, and to selectively move said laser beam relative to said material, said commands including a first command which commands said laser beam to pass to said material during times when it is desired to form said design on said material, and a second command which commands no laser beam during times when it is desired to form the discontinuity in the pattern, to thereby form a pattern which has discontinuous portions further comprising using said controller to determine a desired speed of relative motion between said laser beam and said material based on characteristics of the material being used, said speed being a critical operating speed which is between a) a threshold speed where the laser beam will damage the material by one of undesirably fully penetrating the material, carbonization of the material, melting or burn-through of the material, and b) a maximum speed above which a desired imprint will not be formed on the material.

54. A method as in claim 53 further comprising using said controller to determine a desired speed of relative motion between said laser beam and said material based on characteristics of the material being used, said speed being a critical operating speed which is between a) a threshold speed where the laser beam will damage the material by one of undesirably fully penetrating the material, carbonization of the material, melting or burn-through of the material, and b) a maximum speed above which a desired imprint will not be formed on the material.

55. A method as in claim 54 wherein said movement is effected by moving an output of the laser beam.

56. A method as in claim 53, further comprising changing a surface height of said material by moving said laser beam on said surface.

57. A discontinuous material scribing apparatus, comprising:
  a marking surface;
  a laser producing a laser beam;
  a drive mechanism;
  a laser selecting device, located between said laser beam and said marking surface, and having at least two positions, a first position in which said laser beam is unobstructed and impinges on said marking surface and a second position in which said laser beam is prevented by said laser selecting device from reaching said surface; and
  a controller, controlling at least said drive mechanism and said laser selecting device, said controller storing a stored program indicating a desired pattern to be formed on said marking surface, said desired pattern including at least a first design portion which extends from a first part to a second part, a second design portion which does not connect with said first design portion, said second design portion extending from a third part, unconnected to said second part, and said second design portion extending to a fourth part, said controller controlling said drive mechanism and said laser selecting device, to:
  move said drive mechanism to said first part and move said laser selecting device to said first position so said laser beam shines on said material;
  then move said laser beam to said second part;
  then move said laser selecting device to said second position so that said laser beam is prevented from reaching said material;
  then move said drive mechanism to said third part;
  then move said laser selecting device to said first position so that said laser beam shines on said material; and
  then move said drive mechanism to said fourth part to end a discontinuous part of the pattern wherein said controller also controls a speed of said drive mechanism and said critical operating speed being dependent on characteristics of the specific material being used and characteristics of a design being formed.

58. An apparatus as in claim 57, wherein said controller determines said critical operating speed as a function of all of a) a material material being used, b) a thickness of the material, c) power and wavelength of the laser, d) distance between the laser and the material, and e) a particular design being formed.

59. A device for forming a pattern on a material, comprising:
  a marking surface, adapted in operation to hold a material to be marked;
  a laser device, producing a laser beam, said laser device being placed with its output facing said marking surface, and said laser beam being directed toward a location on said marking surface;
  a drive mechanism, operating to change a position of said laser beam on said marking surface according to an applied command;
  an optical beam width adjusting element, coupled between an output of said laser beam and said marking surface, and operating to adjust an effective width of marking of the laser beam, to effectively adjust an effective width of a pattern portion that is formed by the laser beam on said marking surface; and
  a controller, operating according to a stored sequence which includes information indicating a desired pattern to be formed on said marking surface, said controller producing an output which controls said optical beam width adjusting device to adjust the width of said pattern portion according to a width stored in said stored sequence, said stored sequence including a first design portion which has a thinner width, said controller operating to control said optical beam width adjusting device to command the formation of a thinner width pattern portion responsive to said first design portion, and said stored sequence including a second design portion which commands the formation of a thicker width pattern portion, said controller operating to control said optical beam adjusting device to command said thicker width pattern portion responsive to said second design portion.

60. A device as in claim 59, wherein said controller controls said laser to change a surface height of said material by moving said laser beam on said surface.

61. A device as in claim 59 wherein said controller also controls a relative speed between said marking surface and said laser beam, said relative speed being a critical operating speed which is between a) a threshold speed where the laser beam will damage the material by one of undesirably fully penetrating the material, carbonization of the material, melting or burn-through of the material, and b) a maximum speed above which a desired change will not be formed on the material, and said critical operating speed being dependent on characteristics of the material being used.

62. A device as in claim 61 wherein said optical beam width adjusting element includes a lens.

63. A device as in claim 62 wherein said lens includes a moveable portion, moving to change a position of said lens, and a controllable drive mechanism, controlling movement of said lens, said controller commanding said moveable drive mechanism to move in a way which varies a width of the optical beam responsive to said stored sequence.

64. A device as in claim 61 wherein said optical beam width adjusting element includes a moveable mirror.

65. A device as in claim 64 wherein said moveable mirror includes a moving element, connected to said moveable mirror and controlling said moveable mirror in a way to increase an optical beam width of its output.

66. A device as in claim 65, wherein said beam width is increased by scanning the mirror alternately in directions perpendicular to a desired width.

67. A device as in claim 65 further comprising a plurality of additional mirrors, optically coupled to said laser beam, and moving to adjust a position of said laser beam.

68. A method of forming a design on a material, comprising:
providing a laser device and a material holding surface relative to one another;
selectively operating the laser device, such that an output of the laser device impinges on the material holding surface;
moving a position of said output of said laser device on said material holding surface;
storing a program indicating a desired pattern to be printed on a material which will be placed on the material holding surface, said program indicating said desired design including at least a first stored part indicating a thicker portion area of the design, and a second stored part indicating a thinner portion area of the design; and
controlling a movement between said laser beam and said material holding surface according to the stored program, including controlling an output of said laser beam to form a thicker portion of the design at the first portion and to form a thinner portion of the design at the second portion.

69. A method as in claim 68 further comprising controlling a speed of said laser beam on said material to a critical operating speed which is between a) a threshold speed where the laser beam will damage the material by one of undesirably fully penetrating the material, carbonization of the material, melting or burn-through of the material, and b) a maximum speed above which a desired change not be formed on the material, and said critical operating speed being dependent on characteristics of the material being used.

70. A method as in claim 69 wherein said controlling an output width of said laser beam comprises providing a mirror, and commanding said mirror to scan its movement in a way which spreads the beam on the material.

71. A method as in claim 69 wherein said controlling an output width of said laser beam comprises moving a moveable lens in a way which adjusts an effective beam width on the material.

72. A method as in claim 71 wherein said material is one of denim, leather, cotton, rayon, nylon, wool, silk, or a mixture thereof.

73. A method of forming a pattern on a material, comprising:
obtaining a specific material to be processed;
obtaining a laser to be used to mark said material;
determining, for said specific material, a threshold speed of scanning for said laser, below which undesired damage to the material will be caused;
determining, for said specific material, a maximum speed above which a desired physical change to the material will not be formed; and
commanding the laser to operate on the material to physically change the material in the form of a pattern on the material, by moving a position of the laser beam on the material at a process operating speed between said threshold speed and said maximum speed which are determined for the specific material.

74. A method as in claim 73 wherein said undesired damage to the material includes at least one of carbonization, melt through or undesired burn through.

75. A method as in claim 73 wherein said process operating speed is determined by considering all of at least a particular material, a thickness of the material, characteristics of the laser beam and a particular design to be formed.

76. A method as in claim 75 wherein said forming comprises unrolling material from a roll having an outer surface including material thereon by rotating said roll, said process operating speed being, at least partly, a speed of movement of said roll.

77. A method as in claim 76 further comprising also moving said laser relative to said roll, and controlling movement of said roll to control a first dimension of movement of the laser beam, and controlling a second dimension of movement of the laser beam by moving said laser.

78. A method as in claim 76, further comprising using a mirror to deflect said laser beam towards said material, and controlling movement of said laser beam in a first dimension by movement of said roll and movement of said laser beam in a second direction by movement of said mirror.

79. A method as in claim 78 further comprising at least one secondary mirror to control movement of said laser in a direction different from a direction of control by a primary mirror, thereby forming a thicker part of a pattern by effectively spreading the laser relative to the material.

80. A method as in claim 78 further comprising using another mirror to move the laser beam in a way that effectively spreads the laser beam over the marking surface.

81. A method as in claim 73 further comprising automatically determining a thickness of said material; and
wherein said process operating speed is determined at least partly as a function of said sensed thickness.

82. A method as in claim 73 wherein said maximum and minimum speed determining comprises determines said process operating speed as a function of all of a) a particular material being used, b) a thickness of the material, c) power and wavelength of the laser, d) distance between the laser and the material, and e) a particular design being formed.

83. A method as in claim 73 wherein said moving comprises moving the laser, and further comprising storing a prestored program indicative of said desired pattern, and providing information to indicate specific movement and timing information necessary to form said desired pattern based on said prestored program, said movement occurring at said process operating speed.

84. A method as in claim 73 wherein said moving comprises moving said material, and further comprising storing a pre-stored program indicative of said desired pattern, and providing information to indicate specific movement and timing information necessary to form said desired pattern based on said prestored program, said movement occurring at said process operating speed.

85. A method as in claim 73 further comprising using a mirror to deflect said laser beam to a desired position by commanding said mirror to move in vertical and horizontal directions at said process operating speed to locations based on said stored program.

86. A method as in claim 73, further comprising a automatically sensing a characteristic of said material upon which said critical operating speed is determined, and using said automatically sensed characteristic to adjust said process operating speed,
 to produce said command to control said drive mechanism to move said laser beam on said material to said critical operating speed determined based on said characteristic which was automatically sensed.

87. A method as in claim 86, wherein said characteristic is thickness of the material.

88. A method as in claim 73 further comprising periodically interrupting the laser beam prior to its reaching said material.

89. A method as in claim 88 further comprising storing a program which indicates areas on the marking surface where portions of the patterns are not desired to be formed, and which commands blocking said laser beam at said locations where said pattern portions are not being formed and commands passing said laser beam at locations where said design is being formed.

90. A method as in claim 73 further comprising using a lens to receive an output of said laser beam, and couple said laser beam toward said marking surface.

91. A method as in claim 90 further comprising moving said lens to change a position of the laser beam.

92. A method as in claim 91 further comprising rotating said lens, and laterally moving said lens.

93. A method as in claim 73, wherein said forming comprises controlling said laser to change a surface height of said material by moving said laser beam on said surface.

94. A method of forming a pattern on a fabric material, comprising:
 experimenting on a plurality of different kinds of fabric materials to determine a critical operating speed for each material, said critical operating speed being one where a laser beam forms a desired pattern on said material without damaging the material in an undesired way, said critical operating speed being between a maximum speed at which a desired change to the material is not formed in the material, and a minimum speed below which undesired damage is caused to the material;
 determining a specific material to be used;
 determining a critical operating speed from the previously-obtained critical operating speeds determined by said experimenting; and
 forming a pattern on the material by illuminating the laser beam on the material and moving the laser beam on the material at the selected critical operating speed.

95. A method as in claim 94 further comprising using an automatic characteristic sensor to automatically determine a characteristic of said material; and
 automatically determining said process operating speed based on at least an output of said automatic characteristic sensor.

96. A method as in claim 95 wherein said automatic characteristic sensor is a thickness sensor and said process operating speed is determined at least partly as a function of the automatically sensed thickness.

97. A method as in claim 94 wherein said fabric material is one of denim, leather, cotton, rayon, nylon, wool, silk, or a mixture thereof.

98. A laser apparatus as in claim 94, wherein said change is one of a physical change or a chemical change or both a chemical change and a physical change.

99. A method of altering characteristics of a material, comprising:
 determining at least one characteristic of the material, said at least one characteristic being of a kind which affects a propensity of the material to be physically altered by a radiation source;
 using said at least one characteristic to determine a radiation source power and speed of movement of an output of the radiation source over the material that will cause a desired structural change of the material without undesired damage to the material;
 storing information in a controller indicating a desired pattern to be formed on said material; and
 using said controller to control said radiation source according to said determined radiation source power and speed of movement determined in said using and according to said stored information indicating the desired pattern.

100. A method as in claim 99 further comprising an initial step of modeling a plurality of said materials using said characteristics to determine said power and speed from the modeled characteristics.

101. A method as in claim 99 wherein a part of said stored information indicating the desired pattern includes an indication of a width of a portion of the desired pattern to be formed on said material, and further comprising altering said width according to said stored information.

102. A method as in claim 99 wherein said determining characteristics of the material comprises automatically determining said characteristics.

103. A method as in claim 102 wherein said characteristic includes thickness of the material, and the automatic detecting is carried out by a thickness detector.

104. An apparatus for forming a pattern on a material, comprising:
 a laser, producing a laser beam output;
 an element holding device, which in operation, holds a material on which a pattern is to be formed;
 a laser beam moving element, effecting a movement of said laser beam on said material when said material is located on said element holding device; and
 an automated controller, which stores a pre-stored series of information indicative of pattern positions will form the pattern on said material, and also obtaining information about said material, and determining a critical parameter of said laser beam relative to said material, said critical parameter being a parameter allowing said pattern to be formed by physical altering of a surface of said material without undesired damage to the material, said automated controller controlling said laser and moving speed according to said information indicative of said critical parameter, and also controlling the position of the laser beam according to the prestored series of information to form a pattern on the surface without undesired damage to the surface.

105. An apparatus as in claim 104 wherein said critical parameter is a critical operating speed of the laser beam relative to said holding device.

106. An apparatus as in claim 104 wherein said moving device includes at least one movable mirror in the path of laser beam output, deflecting the laser beam to the material.

107. An apparatus as in claim 104 wherein said material is a fabric material.

108. An apparatus as in claim 107 wherein said fabric material is one of denim, leather, cotton, rayon, nylon, wool, silk, or a mixture thereof.

109. An apparatus as in claim 104 wherein the material is an undyed material.

110. An apparatus as in claim 104 wherein said laser beam moving element is a moving device on the element holding device.

111. An apparatus as in claim 104 wherein said laser beam moving element is a moving element on the laser.

112. A method of producing a design on a material, comprising:

producing a focused beam of radiation, said focused beam being directed to a location where a material to be altered is adapted to be located;

storing pre-stored data which represents pattern portions to be formed to represent a pattern to be inscribed on said material;

determining a critical parameter for said beam of radiation on said material based on characteristics of the material being used, and based on a determined maximum speed for the material being used at which less-than-desired change will be caused to said material, resulting in an imperfect pattern being formed on said material, and a determined minimum operating speed for the material being used at which undesired damage to the material will be formed; and commanding said beam of radiation to move at the critical parameter to locations indicated by said stored pattern portion.

113. A method as in claim 112 wherein said beam of radiation is a laser beam and said critical parameter is a critical operating speed of the laser beam relative to the material.

114. A method as in claim 112 wherein said information includes at least first and second discontinuous pattern segments which include said desired pattern including at least a first design portion which extends from a first part to a second part, a second design portion which does not connect with said first design portion, said second design portion extending from a third part, unconnected to said second part, and said second design portion extending to a fourth part, wherein said commanding said beam of radiation comprises:

moving said beam of radiation to said first part so said laser beam shines on said material to begin said first discontinuous pattern segment;

then moving said beam of radiation to said second part at said critical operating speed for said material;

then interrupting said beam of radiation so that said beam of radiation is prevented from reaching said material to thereby end said first discontinuous pattern segment;

then commanding movement of said beam of radiation to said third part;

then starting said beam of radiation when it is located at said third part to begin said second discontinuous pattern segment;

then moving said beam of radiation to said fourth part at said critical operating speed to end the second discontinuous pattern segment.

115. A method as in claim 114 wherein said beam of radiation is a laser beam.

116. A method as in claim 112 wherein said beam of radiation is a laser beam.

117. An apparatus for scribing a pattern onto a material using a laser, comprising:

a numerically controlled laser system including a working surface on which a material to be processed is adapted to placed, a laser portion which produces a laser output and directs said laser output toward said working surface, and a numerical control portion which stores control information commanding motion between said laser output and said working surface, said numerical control portion storing information indicating: (1) for a specific kind of material being used, information indicating a critical operating speed at a specified laser power, said critical operating speed being between a maximum speed that is too fast to cause a desired change to a surface of the material and a minimum speed, below which undesired damage to the material can occur, and (2) information indicative of a plurality of desired pattern segments which together form the desired pattern to be formed, said numerically controlled laser system responsive to said desired pattern segments to move the laser beam over the material in areas corresponding to said desired pattern segments and to thereby form the pattern on the material.

118. An apparatus as in claim 117 further comprising a laser blocking element with a first position in which the laser beam is allowed to pass, and a second position in which the laser beam is not allowed to pass, and wherein said numerically controlled laser system includes at least information indicative of one discontinuous area where a line segment ends at one location and begins at a second location spaced from said one location and which commands said laser blocking element to allow said laser beam to pass at said one location, commands said laser blocking element to not allow said laser beam to pass at said area between said one location and said second location and commands said laser blocking element to allow said laser beam to pass at said second location.

119. A laser apparatus as in claim 117, wherein said change is a physical change.

120. A method of selectively altering portions of a material to form a desired pattern on the material, comprising:

determining a pattern to be formed on the material;

determining specific characteristics of the material on which the pattern is to be formed;

determining special operational parameters for the material with its specific characteristics, said special operational parameters which allow a focused beam of radiation to form a pattern in the material which changes the material without undesirably damaging the material; and forming a pattern on said material using the special operational parameters.

121. A method as in claim 120, wherein said focused beam of radiation is a laser beam.

122. A method as in claim 120, wherein said determining comprises determining a critical operating speed for said beam of radiation on said specific material based on characteristics of the specific material being used, and based on a determined maximum speed for the material beyond which a desired physical change to a surface of the material will not be formed, and a determined minimum operating speed for the material being used at which damage to the material will be formed.

123. A method as in claim 120, wherein said material is a fabric material.

124. A method as in claim 123, wherein said fabric material is one of denim, leather, cotton, rayon, nylon, wool, silk, or a mixture thereof.

125. A method of producing a discontinuous design on a material, comprising:

storing information which represents pattern portions to be formed to represent a pattern to be inscribed on said material, said information includes at least first and second discontinuous pattern segments which include said desired pattern including at least a first design portion which extends from a first part to a second part, a second design portion which does not connect with said first design portion, said second design portion extending from a third part, unconnected to said second part, and said second design portion extending to a fourth part;

producing a focused beam of radiation;

determining a critical parameter for said beam of radiation on said material based on characteristics of the material being used, by determining a parameter range between a) a first parameter where a desired change to a surface of the material will not be formed, and b) a second parameter where which an imperfect pattern will be formed on said material, and a determined minimum operating speed for the material being used at which damage to the material will be formed;

moving said beam of radiation to said first part so said beam of radiation shines on said material to begin said first discontinuous pattern segment;

then moving said beam of radiation to said second part using said critical parameter for said material;

then interrupting said beam of radiation so that said beam of radiation is prevented from reaching said material to thereby end said first discontinuous pattern segment;

then commanding movement of said beam of radiation to said third part;

then starting said beam of radiation when it is located at said third part to begin said second discontinuous pattern segment;

then moving said beam of radiation to said fourth part using said critical parameter to end the second discontinuous pattern segment.

126. A method of selectively altering portions of a material to form a desired pattern on the material, comprising:

determining a pattern to be formed on a surface of the material;

determining specific characteristics of the material on which the pattern is to be formed;

determining special operational parameters for the material with its specific characteristics, said special operational parameters which allow a focused beam of radiation to form a pattern in the surface of the material, of a type which causes a change in a height of at least a portion of said surface; and forming a pattern on said surface of said material which changes the height of the surface of the material, using said special operational parameters determined by said determining special operational parameters.

127. A method as in claim 126, wherein said special operational parameters are a critical operating speed, said critical operating speed being between a) a threshold speed where the laser beam will damage the material by one of undesirably fully penetrating the material, carbonization of the material, melting or burn-through of the material, and b) a maximum speed above which a desired imprint will not be formed on the material, to thereby print a desired pattern on said material.

128. An pattern forming apparatus operating to form a pattern on a flexible material, comprising:

a marking surface, adapted in operation to hold a specific material to be marked;

a laser device, producing a laser beam, said laser device being placed with its output facing said marking surface, and said laser beam being directed toward a location on said marking surface;

a drive mechanism, operating to change a position of said laser beam on said marking surface according to an applied command; and a controller, determining, for said specific material, a threshold parameter for said laser within which undesired damage to the material will not be caused and within which a desired physical or chemical change to a surface of the material will be caused, said controller controlling said laser device to form a pattern on the material by moving a position of the laser beam on the material using said parameter determined for the specific material.

129. An apparatus as in claim 128, further comprising a characteristic sensor, operating to automatically sense a characteristic of said material upon which said critical parameter is determined, and providing an output to said controller, said controller including an element for operating to adjust said critical parameter based on the characteristic sensed by said sensor, and to produce a command to control according to said parameter.

130. An apparatus as in claim 129, wherein said characteristic is thickness of the material, and said sensor is a thickness sensor.

131. A pattern forming apparatus as in claim 128, wherein said parameter is one which controls said laser to change a surface height of said material by moving said laser beam on said surface.

132. A pattern forming apparatus as in claim 128, wherein said material is one of denim, leather, cotton, rayon, nylon, wool, silk, or a mixture of these materials.

133. An apparatus as in claim 128 wherein said critical parameter is critical operating speed range of said laser relative to said material, beyond which a desired physical change to a surface of the material will not be formed and below which undesired damage to a surface of the material will be caused.

134. An apparatus as in claim 128, wherein said material is a fabric material.

135. A pattern forming apparatus operating to form a pattern on a material, comprising:

a marking surface, adapted in operation to hold a specific material to be marked;

a laser device, producing a laser beam, said laser device being placed with its output facing said marking surface, and said laser beam being directed toward a location on said marking surface;

a drive mechanism, operating to change a position of said laser beam on said marking surface according to an applied command; and a controller, determining, for said specific material, a threshold parameter for said laser within which less damage will occur to the material than would occur from chemical dyeing process, and within which a desired change to a surface of the material will be caused, and, said controller controlling said laser device to form a pattern on the material by moving a position of the laser beam on the material using said parameter determined for the specific material.

136. An apparatus as in claim 135 wherein said threshold parameter is critical operating speed range of said laser relative to said material, beyond which a desired physical change to a surface of the material will not be formed and below which more damage to the material will be caused than would be caused by chemical dyeing processes.

137. An apparatus as in claim 135, wherein said material is a fabric material.

138. An apparatus as in claim 137, wherein said fabric material is one of denim, leather, cotton, rayon, nylon, wool, silk, or a mixture thereof.

139. An apparatus as in claim 137, wherein said fabric material is one of denim, leather, cotton, rayon, nylon, wool, silk, or a mixture thereof.

140. An apparatus as in claim 135, wherein said threshold parameter is a parameter that creates a design on said surface which causes a change in surface height of at least a portion of the surface, and wherein said change to said material is a change to said surface height.

141. A method of selectively altering portions of a material to form a desired pattern on the material, comprising:

determining a pattern to be formed on the material;

determining specific characteristics of the material on which the pattern is to be formed;

determining special operational parameters for the material with its specific characteristics, said special operational parameters which allow a focused beam of radiation to cause a chemical change in a surface of the material that causes a pattern which can be seen to be formed in the material without undesirably damaging the material; and forming a pattern on said material using the special operational parameters.

142. A method as in claim 141, wherein said material is a fabric material.

143. A method as in claim 142, wherein said fabric material is one of denim, leather, cotton, rayon, nylon, wool, silk, or a mixture thereof.

144. A method as in claim 141, wherein said threshold parameter is a parameter that creates a design on said surface which causes a change in surface height of at least a portion of the surface, and wherein said change to said material is a change to said surface height.

145. A method as in claim 141, wherein said threshold parameter is critical operating speed range of said laser relative to said material, beyond which the desired chemical change to a surface of the material will not be formed and below which undesired damage to the material will be caused.

146. An apparatus for forming a pattern on a material, comprising:

a $CO_2$ laser, producing a laser beam output;

an element holding device, which in operation, holds a material on which a pattern is to be formed;

a laser beam moving element, effecting a movement of said laser beam on said material when said material is located on said element holding device; and an automated controller, which stores a pre-stored series of information indicative of pattern positions will form the pattern on said material, and also obtaining information about said material, and determining a critical parameter of said laser beam relative to said material, said critical parameter being a parameter allowing said pattern to be formed by altering of a surface of said material without undesired damage to the material, said automated controller controlling said laser and moving speed according to said information indicative of said critical parameter, and also controlling the position of the laser beam according to the prestored series of information stored program to form a pattern on the surface without undesired damage to the surface.

147. An apparatus as in claim 146 wherein said critical parameter is critical operating speed range of said $CO_2$ laser relative to said material, beyond which a desired physical change to a surface of the material will not be formed and below which undesired damage to a surface of the material will be caused.

148. An apparatus as in claim 147, wherein said material is a fabric material.

149. An apparatus as in claim 148, wherein said fabric material is one of denim, leather, cotton, rayon, nylon, wool, silk, or a mixture thereof.

150. An apparatus as in claim 146, wherein said critical parameter is a parameter that creates a design on said surface which causes a change in surface height of at least a portion of the surface, and wherein said change to said material is a change to said surface height.

151. A method of forming a desired pattern on an undyed fabric type material, comprising:

determining a pattern to be formed on the material;

determining specific characteristics of the material on which the pattern is to be formed;

determining special operational parameters for the material with its specific characteristics, said special operational parameters which allow a focused beam of radiation to form a pattern in the material which can be seen, without undesirably damaging the material; and forming a pattern on said material using the special operational parameters.

152. A method as in claim 151, wherein said material is one of denim, leather, cotton, rayon, nylon, wool, silk, or a mixture thereof.

153. A method as in claim 151, wherein said pattern is formed by changing a physical structure of the material using said focused beam of radiation.

154. A method as in claim 153, wherein said focused beam of radiation is a laser beam.

* * * * *